(12) United States Patent
Jeon et al.

(10) Patent No.: US 9,575,589 B2
(45) Date of Patent: Feb. 21, 2017

(54) MOBILE TERMINAL AND CONTROL METHOD THEREOF

(71) Applicant: LG Electronics Inc., Seoul (KR)

(72) Inventors: Taeyoung Jeon, Seoul (KR); Sungchae Na, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 13/861,144

(22) Filed: Apr. 11, 2013

(65) Prior Publication Data

US 2013/0285951 A1    Oct. 31, 2013

(30) Foreign Application Priority Data

Apr. 26, 2012 (KR) .......................... 10-2012-0043619

(51) Int. Cl.
- *G06F 3/041* (2006.01)
- *G06F 3/0488* (2013.01)
- *G06F 1/16* (2006.01)
- *G06F 3/01* (2006.01)

(52) U.S. Cl.
CPC .......... *G06F 3/0416* (2013.01); *G06F 1/1684* (2013.01); *G06F 1/1694* (2013.01); *G06F 3/013* (2013.01); *G06F 3/017* (2013.01); *G06F 3/0488* (2013.01); *G06F 2200/1637* (2013.01); *G06F 2203/011* (2013.01)

(58) Field of Classification Search
CPC .......... G06F 3/013; G06F 3/16; G06F 3/0416; G06F 3/0488; G06F 1/1684; G06F 1/1694; G06F 3/017; G06F 2200/1637; G06F 2203/011

USPC ............................. 345/173; 178/18.05–18.07
See application file for complete search history.

(56) References Cited

U.S. PATENT DOCUMENTS

| | | | | |
|---|---|---|---|---|
| 7,675,414 | B2 * | 3/2010 | Ray | 340/539.26 |
| 8,111,267 | B2 * | 2/2012 | Ham et al. | 345/646 |
| 8,483,725 | B2 * | 7/2013 | Kim et al. | 455/456.6 |
| 8,606,293 | B2 * | 12/2013 | Kim et al. | 455/456.1 |
| 2006/0125782 | A1 | 6/2006 | Orchard et al. | |

(Continued)

FOREIGN PATENT DOCUMENTS

| | | |
|---|---|---|
| CN | 101493745 A | 7/2009 |
| CN | 101551727 A | 10/2009 |

(Continued)

*Primary Examiner* — Lun-Yi Lao
*Assistant Examiner* — Kelly B Hegarty
(74) *Attorney, Agent, or Firm* — Birch, Stewart, Kolasch & Birch, LLP

(57) ABSTRACT

A mobile terminal including a display unit, a sensing unit configured to acquire one or more pieces of first external state information, a wireless communication unit configured to acquire one or more pieces of second external state information, and a controller configured to change the input mode of the mobile terminal to at least one of a touch input mode with respect to a touch input corresponding to a touch operation performed on the display unit and a non-touch input mode with respect to a non-touch input that does no involves a touch operation performed on the display unit according to at least one of the first external state information and the second external state information, and to change a display screen of the display unit based on the input according to the changed input mode.

17 Claims, 33 Drawing Sheets

(56) References Cited

U.S. PATENT DOCUMENTS

| | | |
|---|---|---|
| 2007/0085157 A1 | 4/2007 | Fadell et al. |
| 2008/0284775 A1* | 11/2008 | Shen et al. .................... 345/214 |
| 2010/0016014 A1 | 1/2010 | White |
| 2010/0146444 A1 | 6/2010 | Wang et al. |
| 2011/0016390 A1* | 1/2011 | Oh ........................ G06F 3/0482 |
| | | 715/702 |
| 2011/0047510 A1 | 2/2011 | Yoon |
| 2012/0038546 A1 | 2/2012 | Cromer et al. |
| 2012/0039505 A1 | 2/2012 | Bastide et al. |
| 2012/0081282 A1 | 4/2012 | Chin |
| 2013/0169560 A1* | 7/2013 | Cederlund et al. ........... 345/173 |
| 2013/0285951 A1* | 10/2013 | Jeon et al. .................... 345/173 |
| 2014/0104265 A1* | 4/2014 | Park et al. .................... 345/214 |

FOREIGN PATENT DOCUMENTS

| | | |
|---|---|---|
| CN | 101558372 A | 10/2009 |
| CN | 101626418 A | 1/2010 |
| CN | 102004545 A | 4/2011 |
| EP | 1942404 A2 | 7/2008 |
| EP | 2077491 A1 | 7/2009 |

\* cited by examiner

FIG. 18
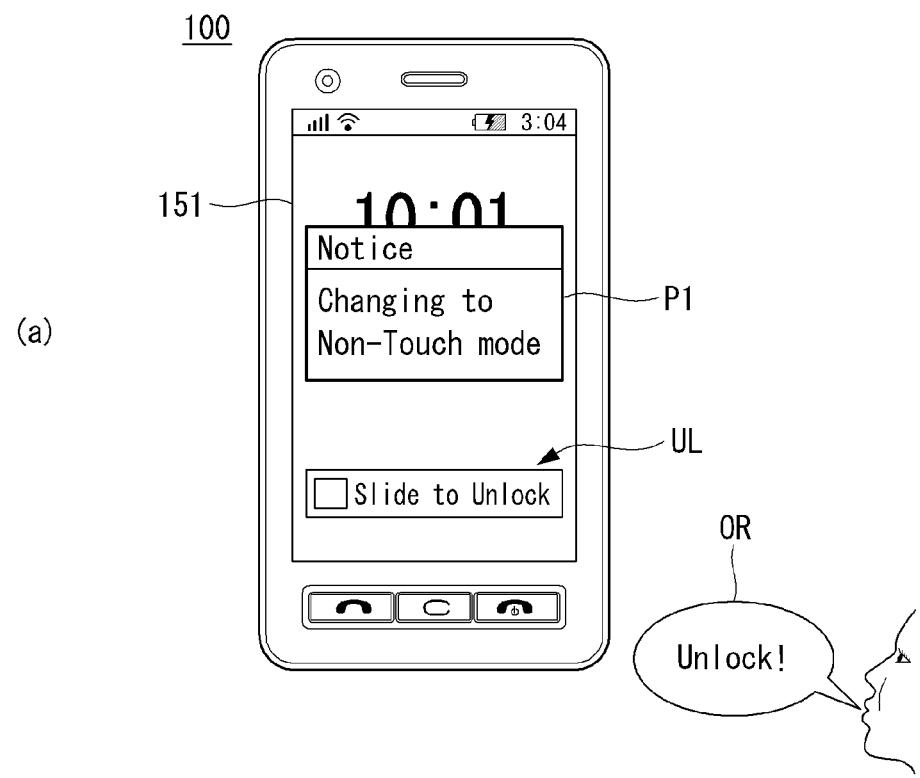
(a)
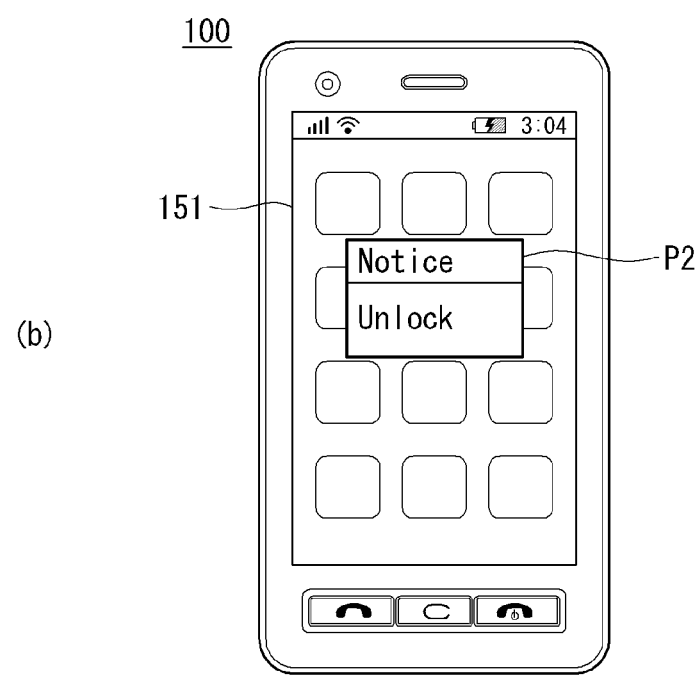
(b)

FIG. 21
(a) 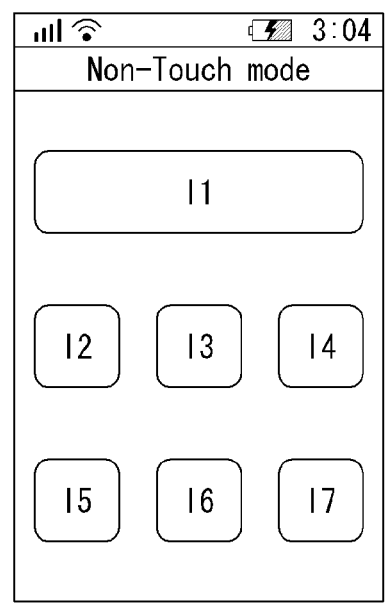
(b) 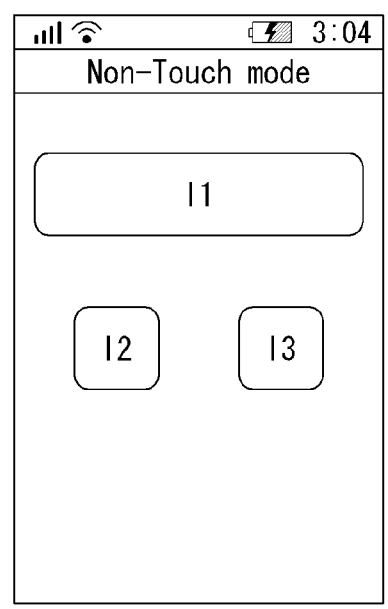

FIG. 25
(a)
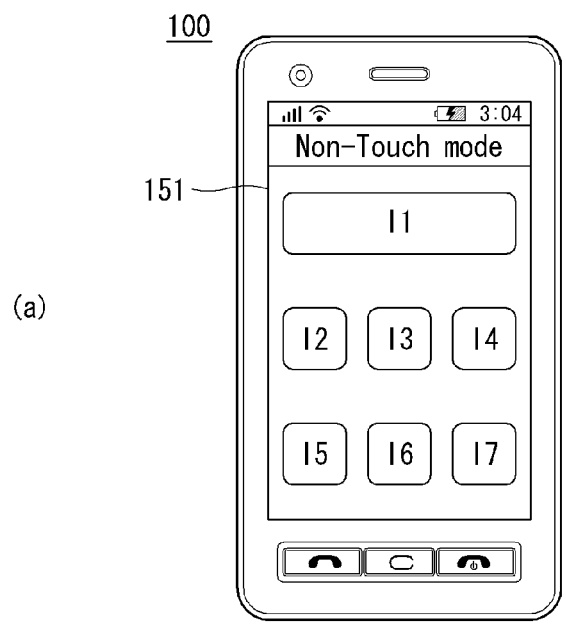
(b)
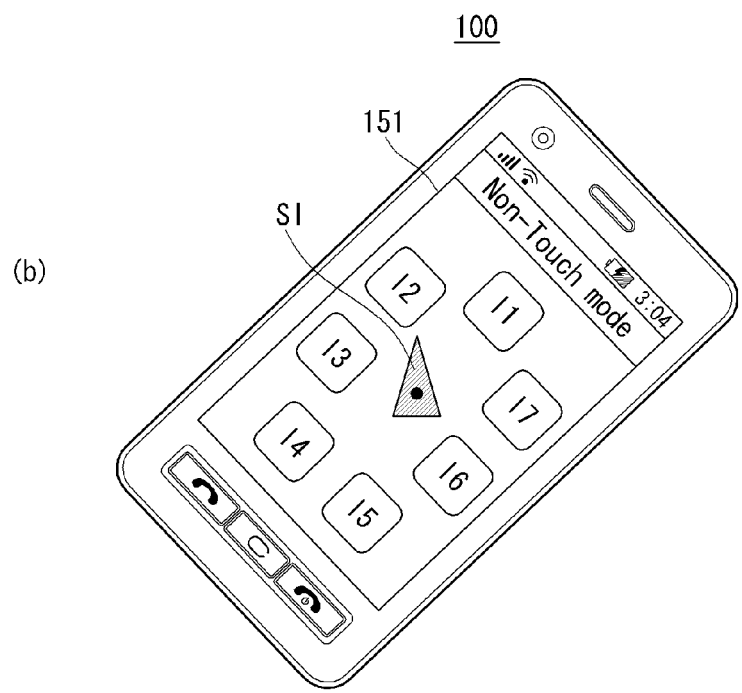

FIG. 29
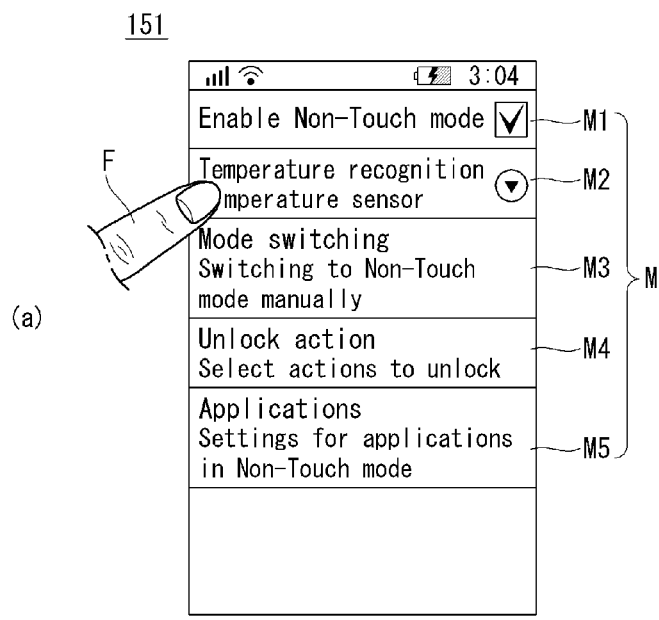
(a)
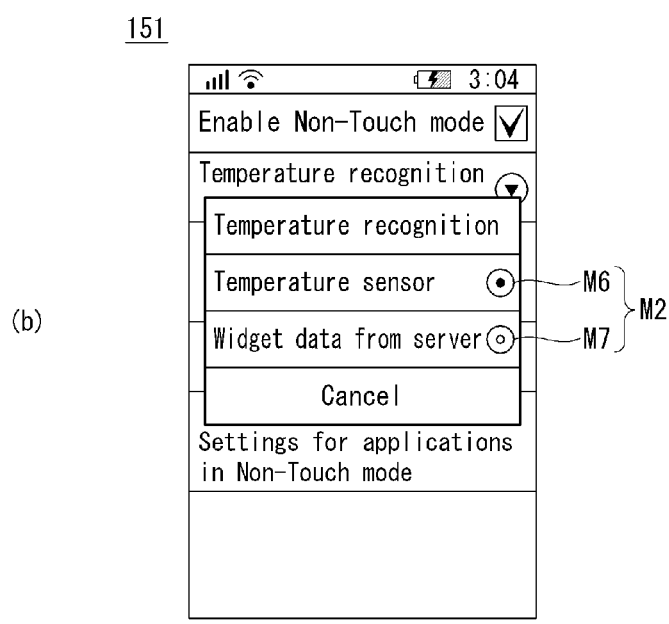
(b)

FIG. 30
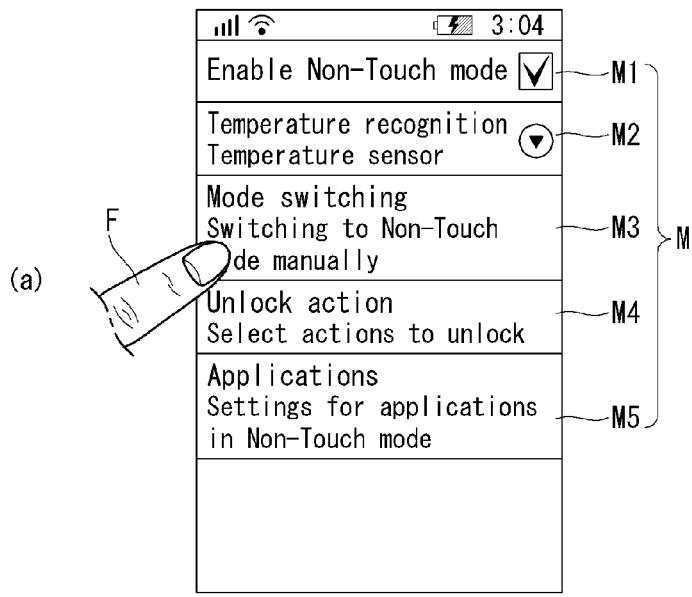
(a)
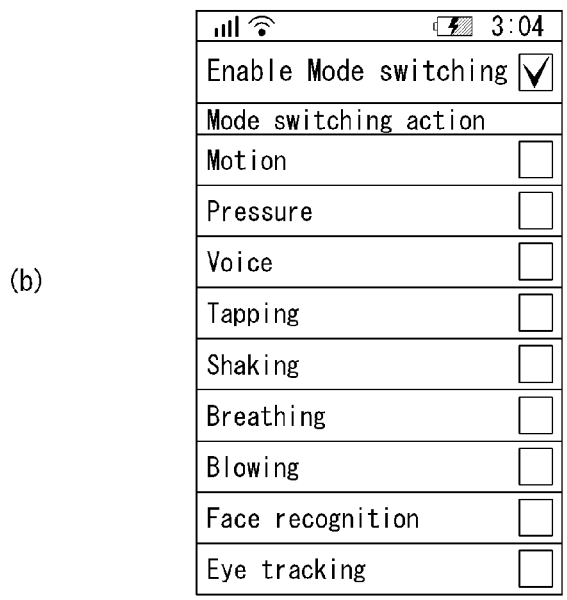
(b)

FIG. 31
(a) 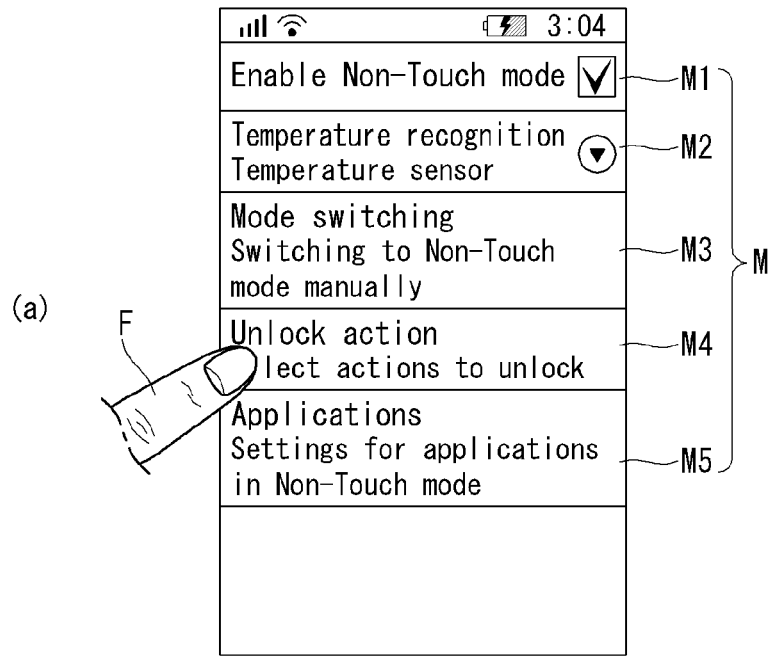
(b) 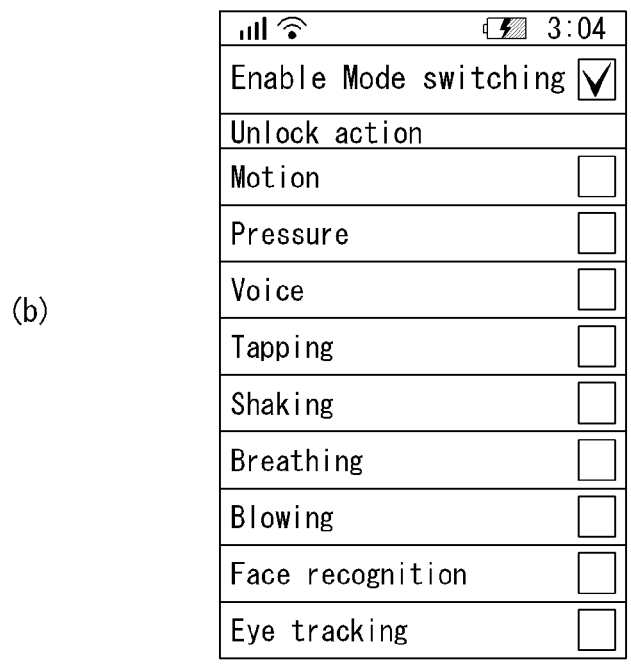

FIG. 32
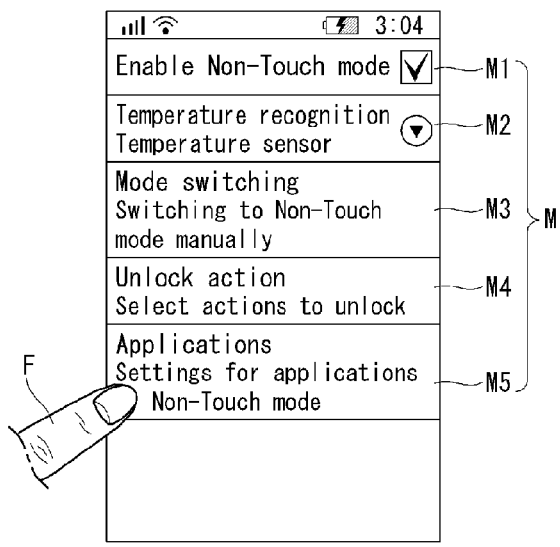
(a)
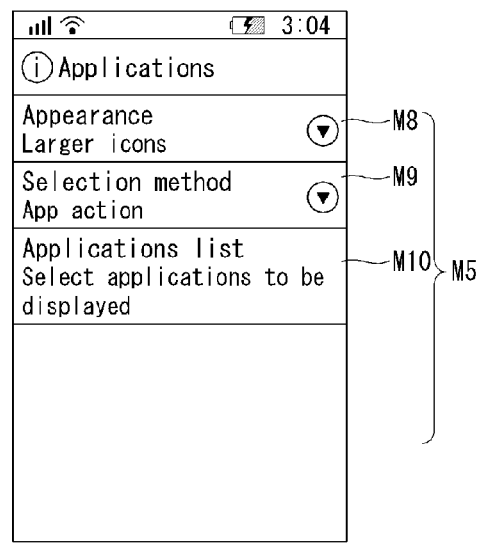
(b)
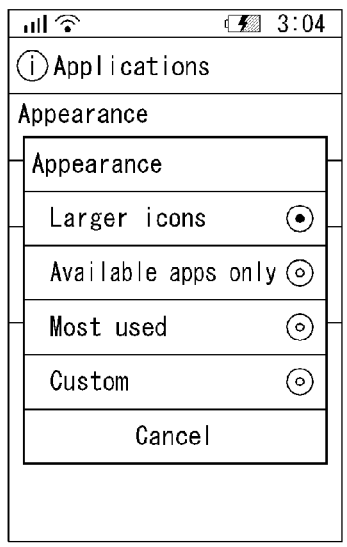
(c)
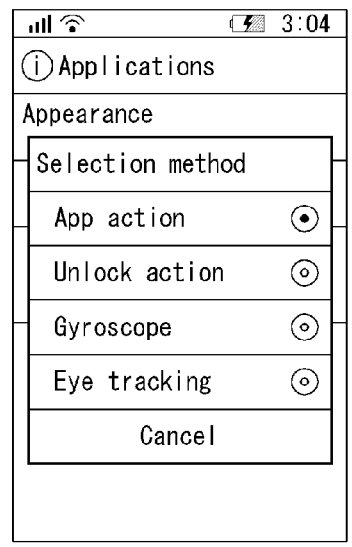
(d)

MOBILE TERMINAL AND CONTROL METHOD THEREOF

CROSS-REFERENCE TO RELATED APPLICATIONS

Pursuant to 35 U.S.C. §119(a), this application claims the benefit of the earlier filing date and right of priority to Korean Patent Application No. 10-2012-0043619, filed on 26 Apr. 2012, the contents of which are incorporated by reference herein in their entirety.

TECHNICAL FIELD

The present invention relates to a mobile terminal, and more particularly, to a mobile terminal and a method of controlling the same to change the input mode of the mobile terminal to a touch input mode or a non-touch input mode on the basis of external state information, to thereby achieve operations of the mobile terminal optimized for surrounding environments.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

An input means of the conventional terminal is restricted regardless of surrounding environments, and thus users suffer inconvenience when using the terminal.

SUMMARY

An object of the present invention is to provide a mobile terminal and a method of controlling the same to change the input mode of the mobile terminal to a touch input mode or a non-touch input mode on the basis of external state information, to thereby achieve operations of the mobile terminal optimized for surrounding environments.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 21 and 22 show icon arrangements displayed when the mobile terminal shown in FIG. 1 enters the non-touch input mode;

FIGS. 23 to 26 illustrate a procedure of selecting a icon in the non-touch input mode of the mobile terminal shown in FIG. 1;

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
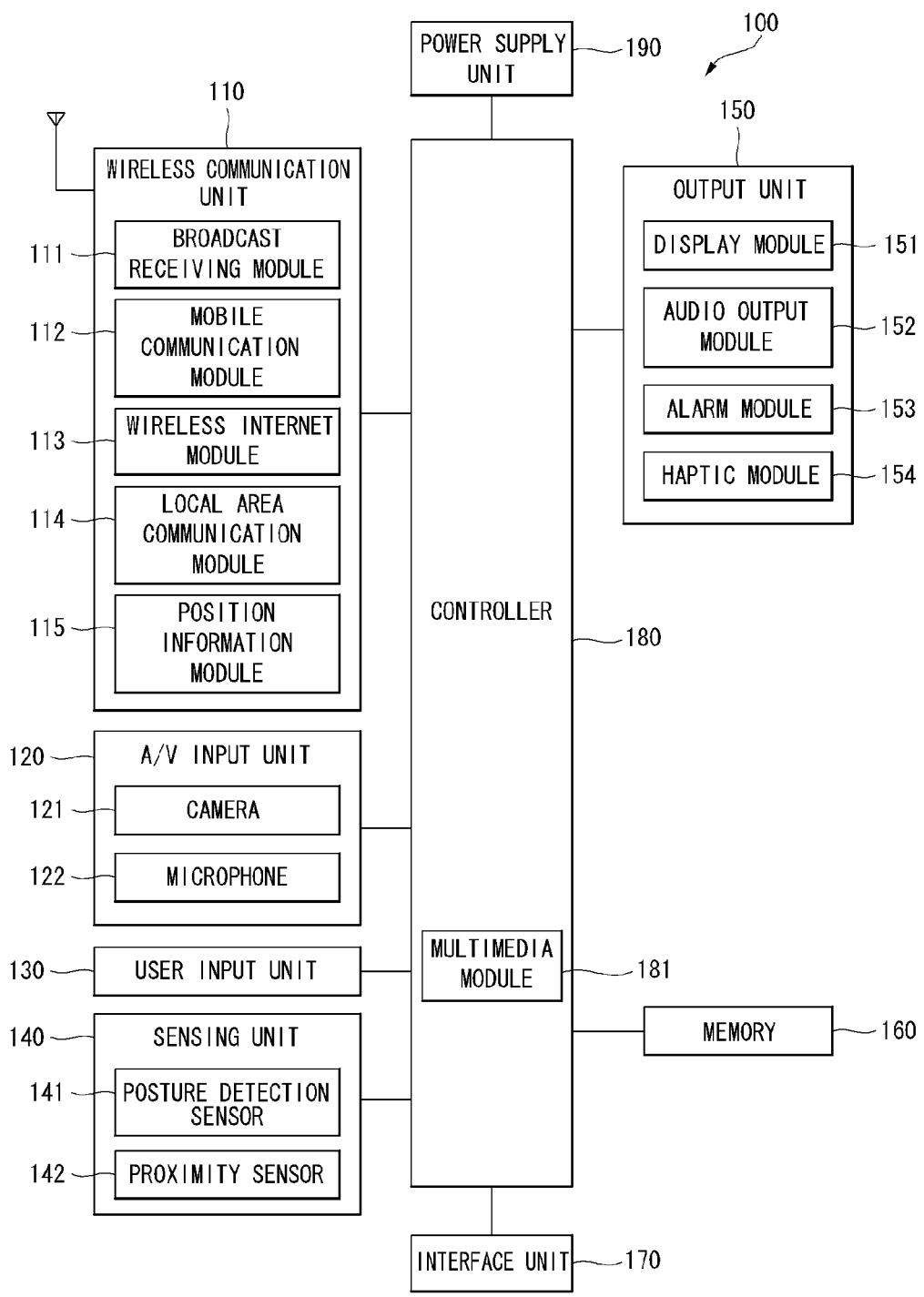
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or ZIG-BEE® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a minor reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
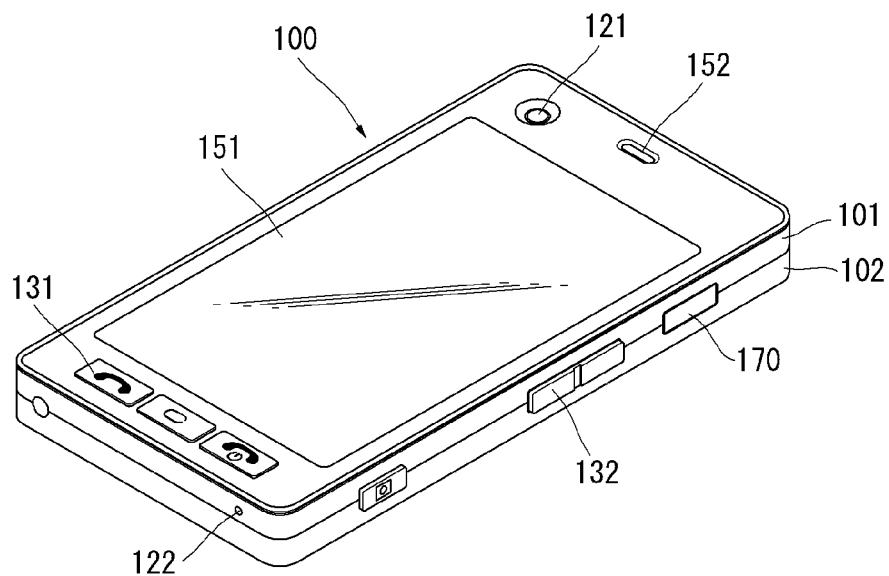
FIG. 2A is a front perspective view of the mobile terminal according to an embodiment.

FIG. 2A is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 131, and the microphone 122 may be located in a region in proximity to another end of the display 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display 151 to a touch recognition mode.

Figure 2B:
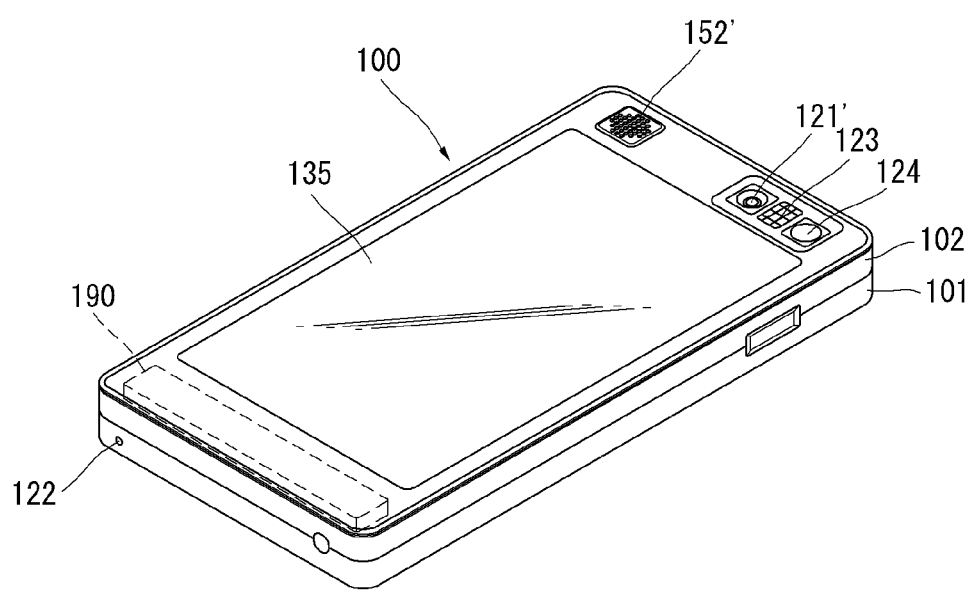
FIG. 2B is a rear perspective view of the mobile terminal according to an embodiment.

FIG. 2B is a rear perspective view of the mobile terminal (shown in FIG. 2A) according to an embodiment.

Referring to FIG. 2A, a camera 121' may be additionally attached to the rear side of the terminal body (i.e., the rear case 102). The camera 121' may have a photographing direction opposite to that of the camera 121 (shown in FIG. 2A) and may have pixels different from those of the camera 121 (shown in FIG. 2A).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the minor when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2A) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display 151 of the front case 101. The touch pad 135 may be located in parallel with the display 151 behind the display 151. The touch panel 135 may be identical to or smaller than the display 151 in size.

Figure 3:
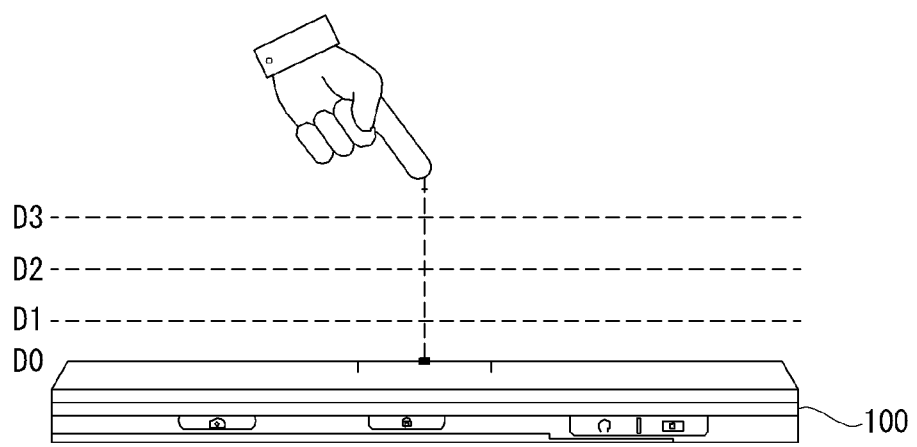
FIG. 3 is a view for explaining a proximity depth of a proximity sensor.

FIG. 3 is a view for explaining a proximity depth of a proximity sensor.

As shown in FIG. 3, when a pointer (such as a user's finger) approaches the touch screen, the proximity sensor located inside or near the touch screen may sense the approach of the pointer, and may output a proximity signal.

The proximity sensor may be constructed such that the proximity sensor outputs a proximity signal according to a distance between the pointer approaching the touch screen and the touch screen (referred to as "proximity depth").

The distance in which the proximity signal is output when the pointer approaches the touch screen may be referred to as a detection distance. The proximity depth may be determined by using a plurality of proximity sensors having different detection distances and by comparing proximity signals respectively output from the proximity sensors.

FIG. 3 shows a section of the touch screen in which proximity sensors capable of sensing three proximity depths may be provided. Proximity sensors capable of sensing less than three or more than four proximity depths may be provided in the touch screen.

More specifically, when the pointer completely contacts the touch screen (D0), it may be recognized as contact touch. When the pointer is located within a distance D1 from the touch screen, it may be recognized as a proximity touch of a first proximity depth. When the pointer is located in a range between the distance D1 and a distance D2 from the touch screen, it may be recognized as a proximity touch of a second proximity depth. When the pointer is located in a range between the distance D2 and a distance D3 from the touch screen, it may be recognized as a proximity touch of a third proximity depth. When the pointer is located greater than the distance D3 from the touch screen, it may be recognized as cancellation of the proximity touch.

Accordingly, the controller 180 may recognize the proximity touch as various input signals according to proximity distance and proximity position of the pointer with respect to the touch screen, and the controller 810 may perform various operation controls according to the input signals.

Figure 4:
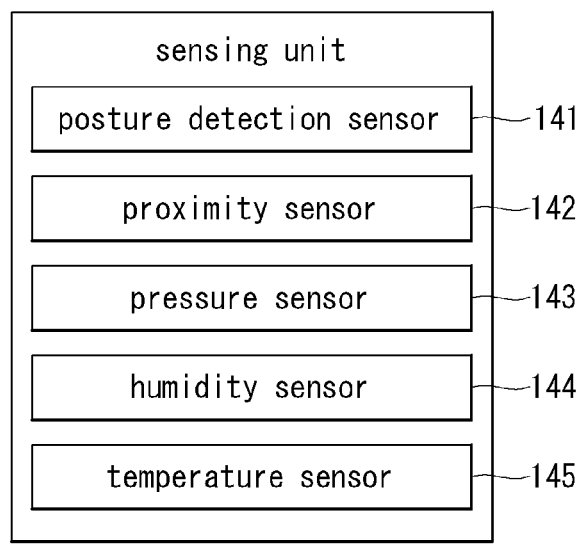
FIG. 4 is a block diagram of a sensing unit of the mobile terminal shown in FIG. 1.

FIG. 4 is a block diagram of the sensing unit of the mobile terminal shown in FIG. 1.

Referring to FIG. 4, the sensing unit 140 of the mobile terminal 100 according to an embodiment of the present invention may include the posture detection sensor 141, the proximity sensor 142, a pressure sensor 143, a humidity sensor 144 and a temperature sensor 145.

The posture detection sensor 141 may sense a degree of tilting of the mobile terminal 100, the orientation of the mobile terminal 100, etc. The posture detection sensor 141 may also include an acceleration sensor, geomagnetic sensor, etc.

The proximity sensor 142 may sense proximity of an object to the mobile terminal 100 and/or a degree of proximity. The proximity sensor 142 may be configured using an infrared sensor or the like.

The pressure sensor 143 may sense whether a user grips the mobile terminal 100 and/or a degree of grip. The pressure sensor 143 may be provided to at least one of the side, front and back of the mobile terminal 100. The pressure sensor 143 may be a touch sensor included in the display 151. The pressure sensor 143 can be located at portions of the mobile terminal 100 including the display 151 to sense whether the mobile terminal 100 is gripped by the user.

The humidity sensor 144 may sense the ambient humidity of the mobile terminal 100. The humidity sensor 144 may be provided to a point at the body of the mobile terminal 100. If the humidity sensor 144 is located at the front side of the mobile terminal 100, the humidity sensor 144 can sense blowing of the user. The controller 180 can estimate use of the mobile terminal 100, the posture of the mobile terminal 100 when gripped, etc. based on blowing of the user, sensed by the humidity sensor 144. Furthermore, the current temperature around the mobile terminal 100 may be estimated using the humidity sensor 144.

The temperature sensor 145 may sense the ambient temperature of the mobile terminal 100. The temperature sensor 145 may be provided to a point at the body of the mobile terminal 100 or located at a plurality of points at the body of the mobile terminal 100 in a distributed manner. The temperature sensor 145 may sense whether the mobile terminal 100 is gripped. For example, the temperature sensor 145 can sense the body temperature of the user who grips the mobile terminal 100.

Temperature data sensed by the temperature sensor 145 may be combined with other data and used to estimate the current state of the mobile terminal 100. For example, when there is no variation in the temperature of the body of the mobile terminal 100 due to a low external temperature in the winter while the posture detection sensor 141 senses lifting of the mobile terminal 100, the controller 180 can estimate that the user wears gloves. That is, it can be considered that the user grips the mobile terminal 100 while wearing gloves. In this case, the controller 180 can provide a user interface environment in which the mobile terminal 100 can be controlled using a means other than touch. That is, the controller 180 can provide an environment in which a non-touch input can be applied to the mobile terminal 100. The controller 180 of the mobile terminal 100 according to an embodiment of the present invention can provide an input means optimized for the current state of the mobile terminal 100.

Figure 5:
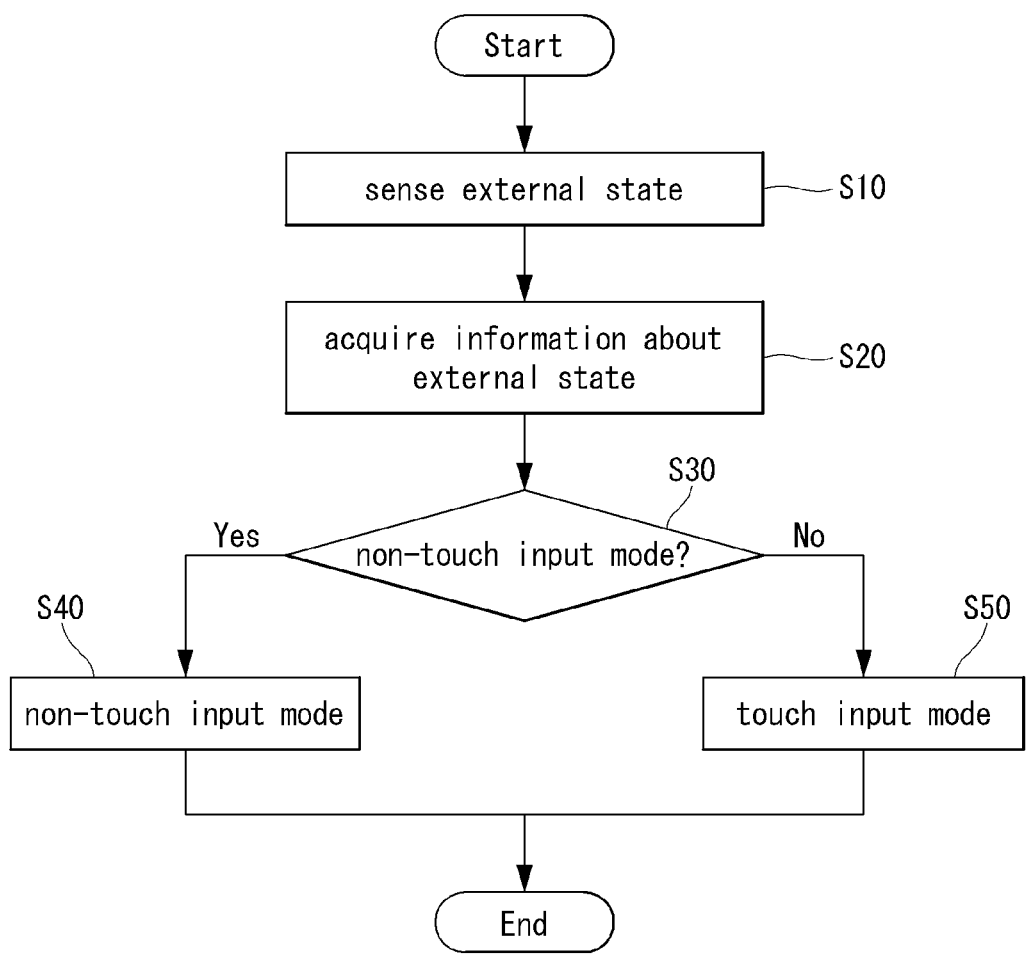
FIG. 5 is a flowchart illustrating an operation of the mobile terminal shown in FIG. 1.

FIG. 5 is a flowchart illustrating an operation procedure of the mobile terminal shown in FIG. 1.

Referring to FIG. 5, the controller 180 of the mobile terminal 100 according to an embodiment of the invention may sense an external state (S10).

The external state may be sensed by the sensing unit 140 of the mobile terminal 100. For example, the temperature sensor (145 of FIG. 4) provided to the mobile terminal 100 can sense the ambient temperature of the mobile terminal 100.

Sensing the external state may be continuously performed when the mobile terminal 100 is in an active state or in an inactive state. For example, when the user performs a specific operation, the sensing unit 140 can be activated to collect external state data, or automatically collect the external state data at predetermined intervals.

Information about the external state is acquired (S20).

The information about the external state may be acquired through the wireless communication unit 110. That is, the information about the external state may be obtained through other terminals and/or a server. For example, data such as current temperature, humidity, sunrise/sunset, etc. of an area where the mobile terminal 100 is located can be acquired through the wireless communication unit 110.

It is determined whether the mobile terminal 100 enters the non-touch input mode (S30), and the mobile terminal 100 may operate in the non-touch input mode (S40) or in a touch input mode (50) based on the determination result.

The non-touch input mode may be a state in which the mobile terminal 100 can be controlled through a means other than a touch input. That is, in the non-touch input mode, the user can operate the mobile terminal 100 using a method other than direct physical touch of the display 151 of the mobile terminal 100. For example, a non-touch input can include at least one of a specific motion applied to the mobile terminal 100, a specific pressure applied to the mobile terminal 100, voice of the user of the mobile terminal 100, blowing of the user of the mobile terminal 100, a gesture of the user of the mobile terminal 100, tilting of the mobile terminal 100, and a direction of the eyes of the user of the mobile terminal 100 toward a specific point of the mobile terminal 100. In the following description, an operation of the display 151 through direct touch corresponds to the touch input state or touch input mode and other operations correspond to the non-touch input state or non-touch input mode.

Changing to the non-touch input mode may be performed on the basis of the current state of the mobile terminal 100. That is, changing to the non-touch input mode may be carried out on the basis of the sensed and/acquired external state. For example, a motion of gripping the mobile terminal 100 can be sensed by the posture detection sensor (141 of FIG. 14) in an environment in which an external temperature sensed by the temperature sensor (145 of FIG. 4) is low and the current location of the mobile terminal 100, sensed by the position information module (115 of FIG. 1), is outside. In this situation, the controller 180 can determine that it is difficult for the user to operate the mobile terminal because the user wears gloves and thus change the mobile terminal 100 to the non-touch input mode.

Conditions of changing to the non-touch input mode may be changed by a control operation of the controller 180 and/or user setting. For example, if a condition that the temperature should be lower than a predetermined level is satisfied, the controller 180 can change the input mode of the mobile terminal 100 to the non-touch input mode. Otherwise, when the temperature is lower than the predetermined level and the body temperature of the user is not sensed through the mobile terminal 100, the controller 180 can change the input mode of the mobile terminal 100 to the non-touch input mode. There may be various conditions of changing to the non-touch input mode, which will be described in detail below.

Figure 6:
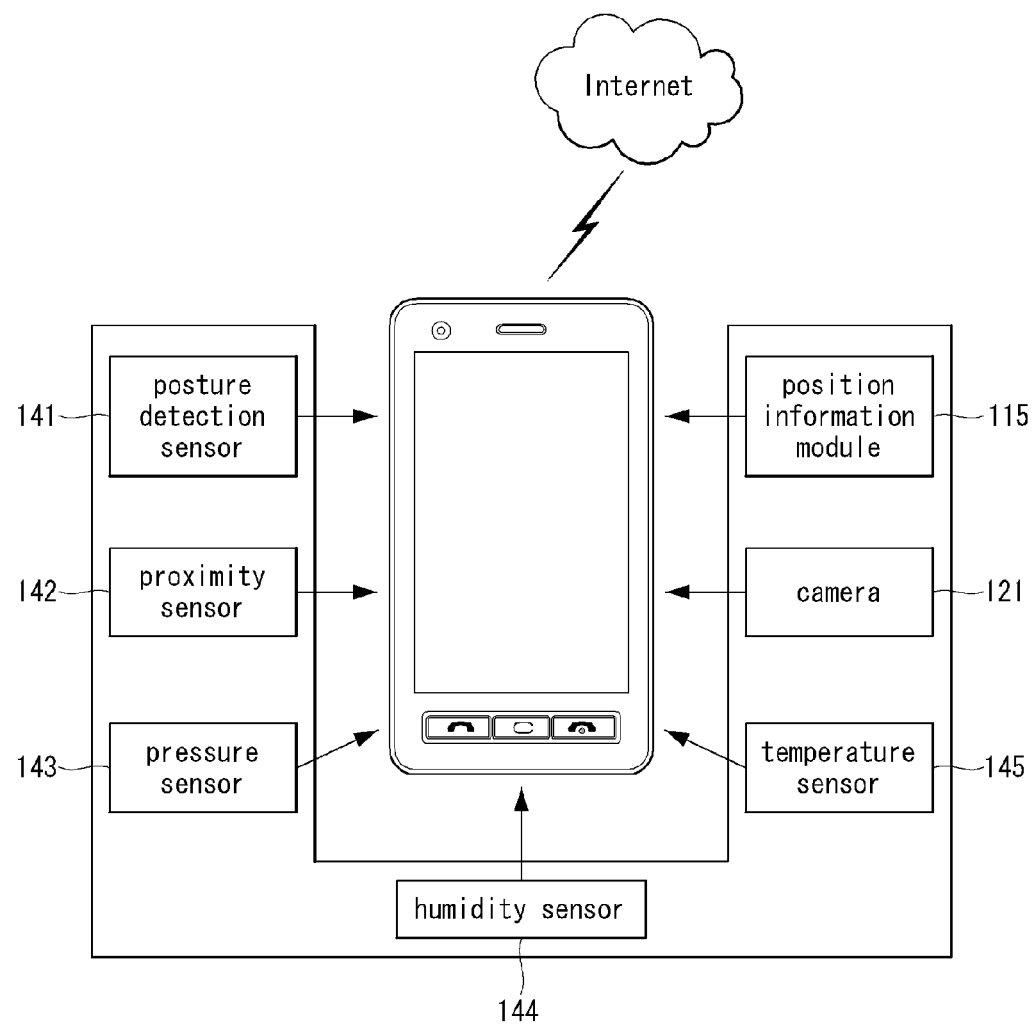
FIG. 6 illustrates a method of acquiring information in the mobile terminal shown in FIG. 1.

FIG. 6 illustrates an information acquisition method performed by the mobile terminal shown in FIG. 1.

As shown in FIG. 6, the mobile terminal 100 according to an embodiment of the invention can sense and/or acquire data through various sensors and/or wireless communication.

The mobile terminal 100 may include a variety of sensors including the posture detection sensor 141, the proximity sensor 142, the pressure sensor 143, the humidity sensor 144, and the temperature sensor 145, as described above.

The mobile terminal 100 may include at least one camera 121. For example, the cameras 121 and 121' can be provided to the front side and/or rear side of the body of the mobile terminal 100.

The mobile terminal 100 may include the position information module 115. The controller 180 may sense data such as the current position and/or altitude of the mobile terminal 100 through the position information module 115.

The mobile terminal 100 may acquire information about an external state through the wireless communication unit 110. That is, the mobile terminal 100 can obtain data such as external temperature, location, etc. from other terminals and/or a server through wireless communication.

FIGS. 7 to 14 illustrate information acquisition of the mobile terminal shown in FIG. 1.

As shown in FIGS. 7 to 14, the mobile terminal 100 according to the embodiment of the present invention can sense the current state thereof through various sensors.

Figure 7:
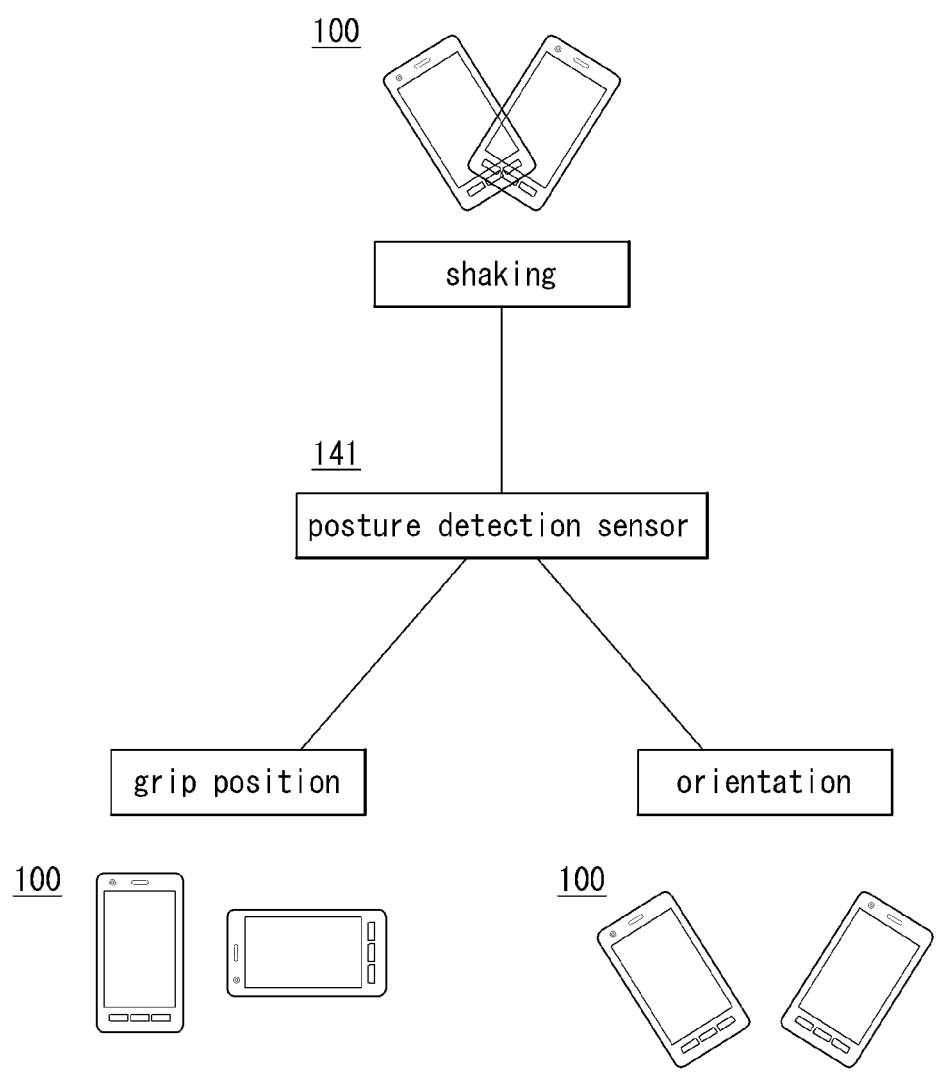
FIGS. 7 to 14 illustrate operations of the mobile terminal shown in FIG. 1 to acquire information.

Referring to FIG. 7, the mobile terminal 100 may include the posture detection sensor 141.

The posture detection sensor 141 can sense shaking of the mobile terminal 100. For example, shaking of the mobile terminal 100 to the left and right can be sensed using an acceleration sensor included in the posture detection sensor 141. The mobile terminal 100 may be shaken when the user grips the mobile terminal 100 in order to use the mobile terminal 100. Accordingly, the controller 180 can recognize whether the user grips the mobile terminal 100 on the basis of information about whether the mobile terminal 100 is shaken, a shaking pattern, etc.

The posture detection sensor 141 can sense the posture of the mobile terminal 100. For example, the posture detection sensor 141 can sense whether the mobile terminal 100 is positioned in a portrait or landscape form using the acceleration sensor, geomagnetic sensor, etc. included therein.

The posture detection sensor 141 can sense the orientation of the mobile terminal 100. For example, the posture detection sensor 141 can sense the orientation of the mobile terminal 100 using the geomagnetic sensor included therein.

Figure 8:
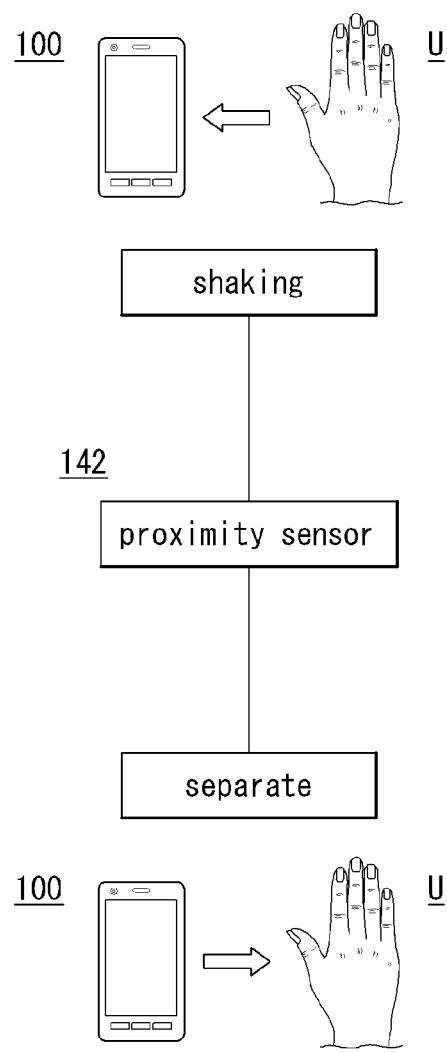

Referring to FIG. 8, the mobile terminal 100 may include the proximity sensor 142.

The proximity sensor 142 can sense proximity of an external object to the mobile terminal 100. For example, the proximity sensor 142 can sense approach of a hand U of the user to the mobile terminal using an infrared sensor.

The proximity sensor 142 can sense separation of an external object from the mobile terminal 100. For example, the proximity sensor 142 can sense separation of the hand U of the user from the mobile terminal 100. The proximity sensor 142 can sense a distance between the mobile terminal 100 and the user's hand U that approaches or is separated from the mobile terminal 100.

Figure 9:
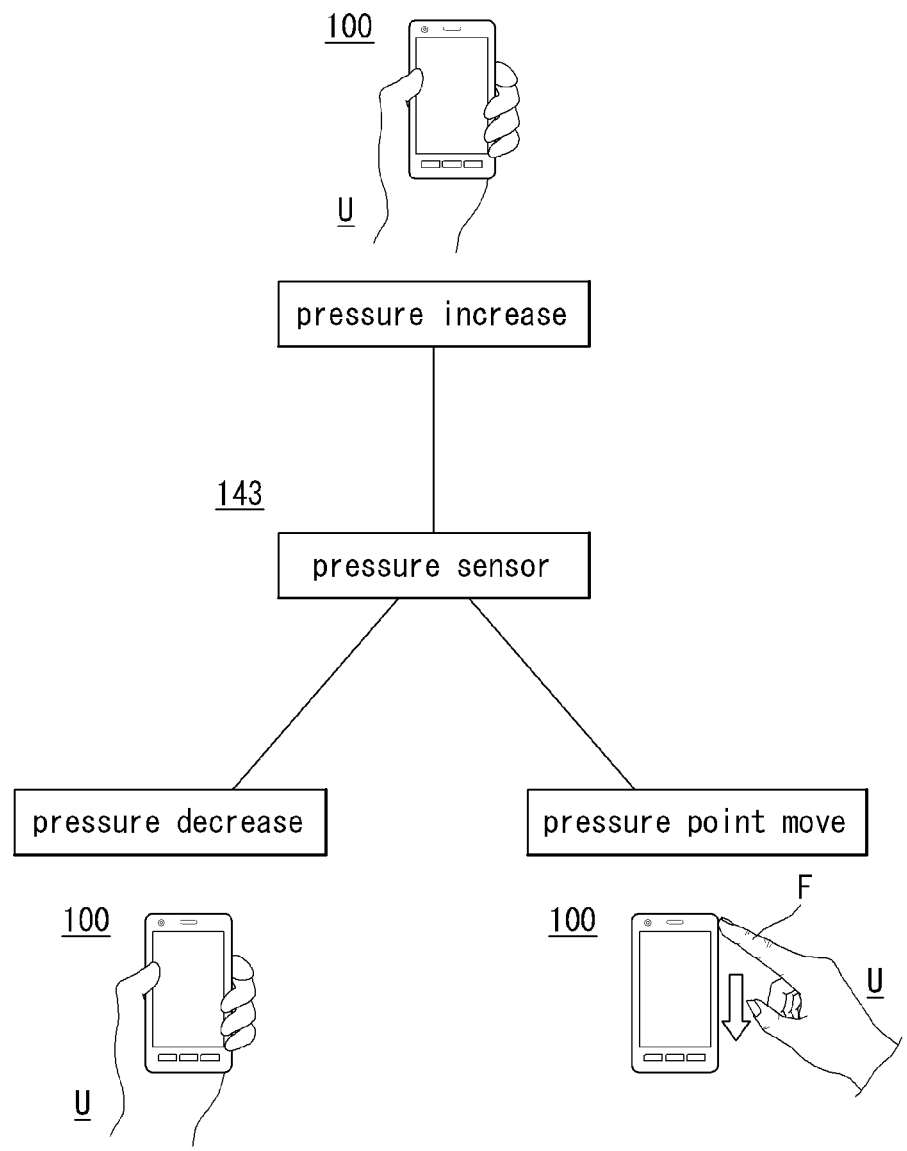

Referring to FIG. 9, the mobile terminal 100 may include the pressure sensor 143.

The pressure sensor 143 can sense an increase/decrease in the pressure applied to the body of the mobile terminal 100. For example, when the pressure applied to the body of the mobile terminal 100 increases since the user grips the mobile terminal 100 with his/her hand U or decreases since the gripping force is reduced, the pressure sensor 143 can sense this pressure increase or decrease.

The pressure sensor 143 can also sense a movement of a pressure point. For example, the pressure sensor 143 can sense a movement of pressure applied by a user finger F to the body of the mobile terminal from the top to the bottom of the side of the mobile terminal 100.

Figure 10:
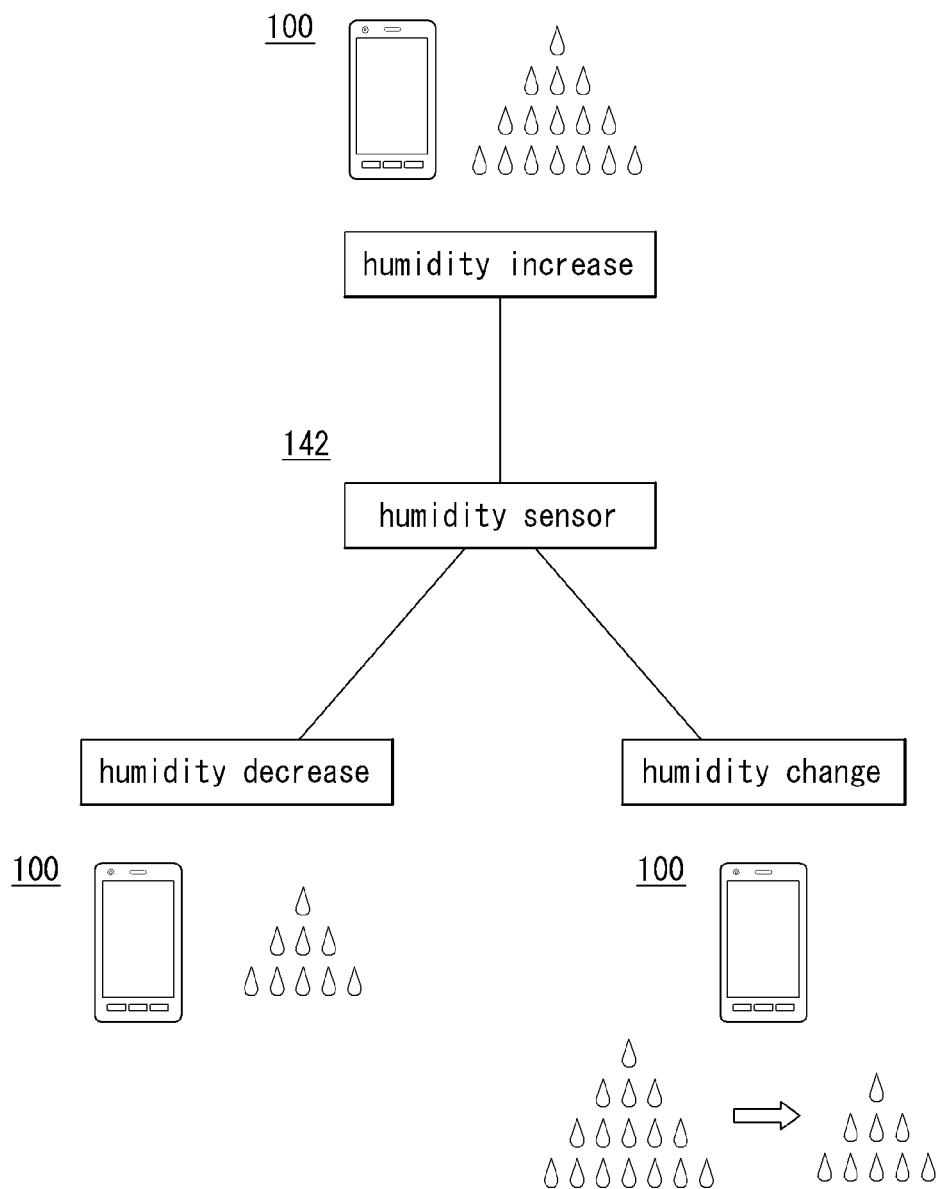

Referring to FIG. 10, the mobile terminal 100 may include the humidity sensor 144.

The humidity sensor 144 can sense at least one of an increase, decrease and variation in the ambient humidity of the mobile terminal 100. For example, the humidity sensor 144 can sense humidity varying according to blowing of the user who grips the mobile terminal 100.

Figure 11:
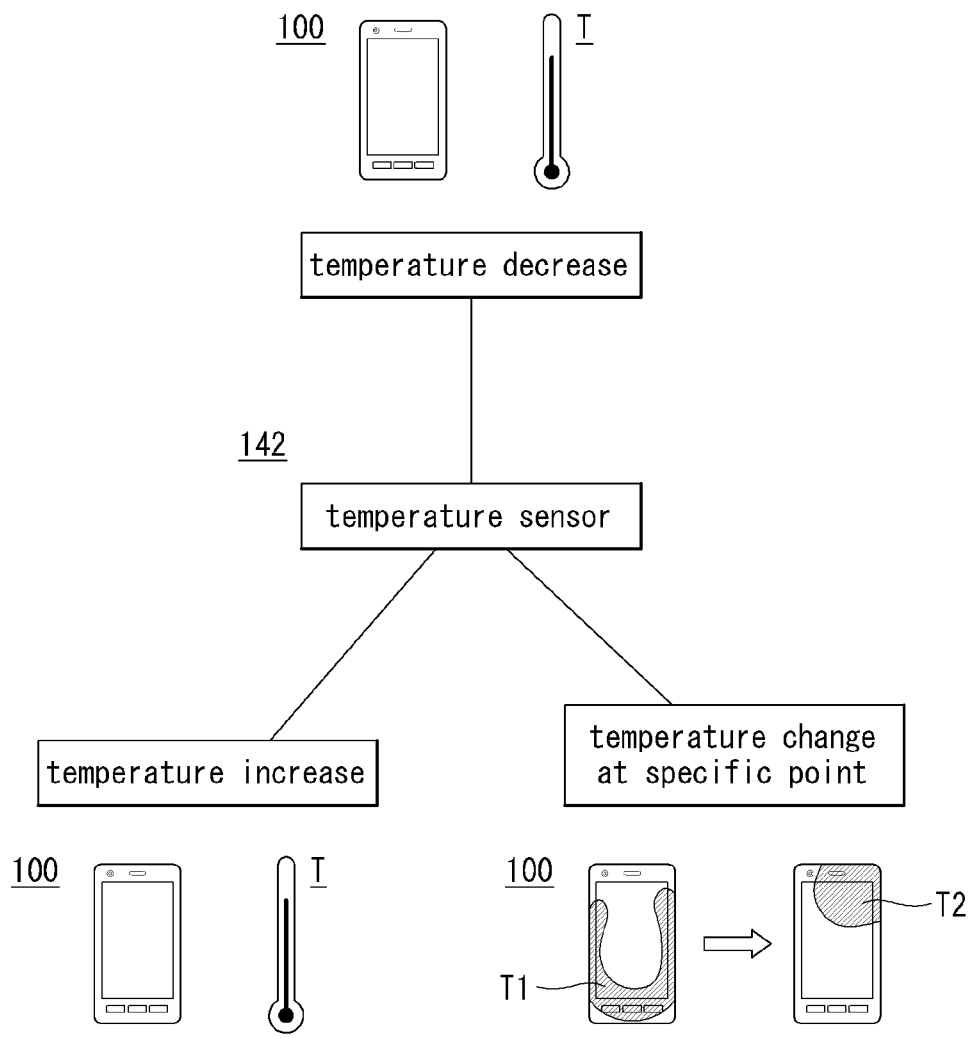

Referring to FIG. 11, the mobile terminal 100 may include the temperature sensor 145.

The temperature sensor 145 can sense a temperature increase and/or temperature decrease. Furthermore, the temperature sensor 145 can sense a temperature variation at a specific point of the body of the mobile terminal 100. For example, the temperature sensor can sense a change from temperature distribution T1 at a first time to temperature distribution T2 at a second time. The temperature of the body of the mobile terminal 100 may be changed by the body temperature of the hand of the user who grips the body of the mobile terminal 100. The controller 180 can recognize how the user grips the mobile terminal 100 since a temperature variation at a specific point of the body of the mobile terminal 100 can be sensed.

Figure 12:
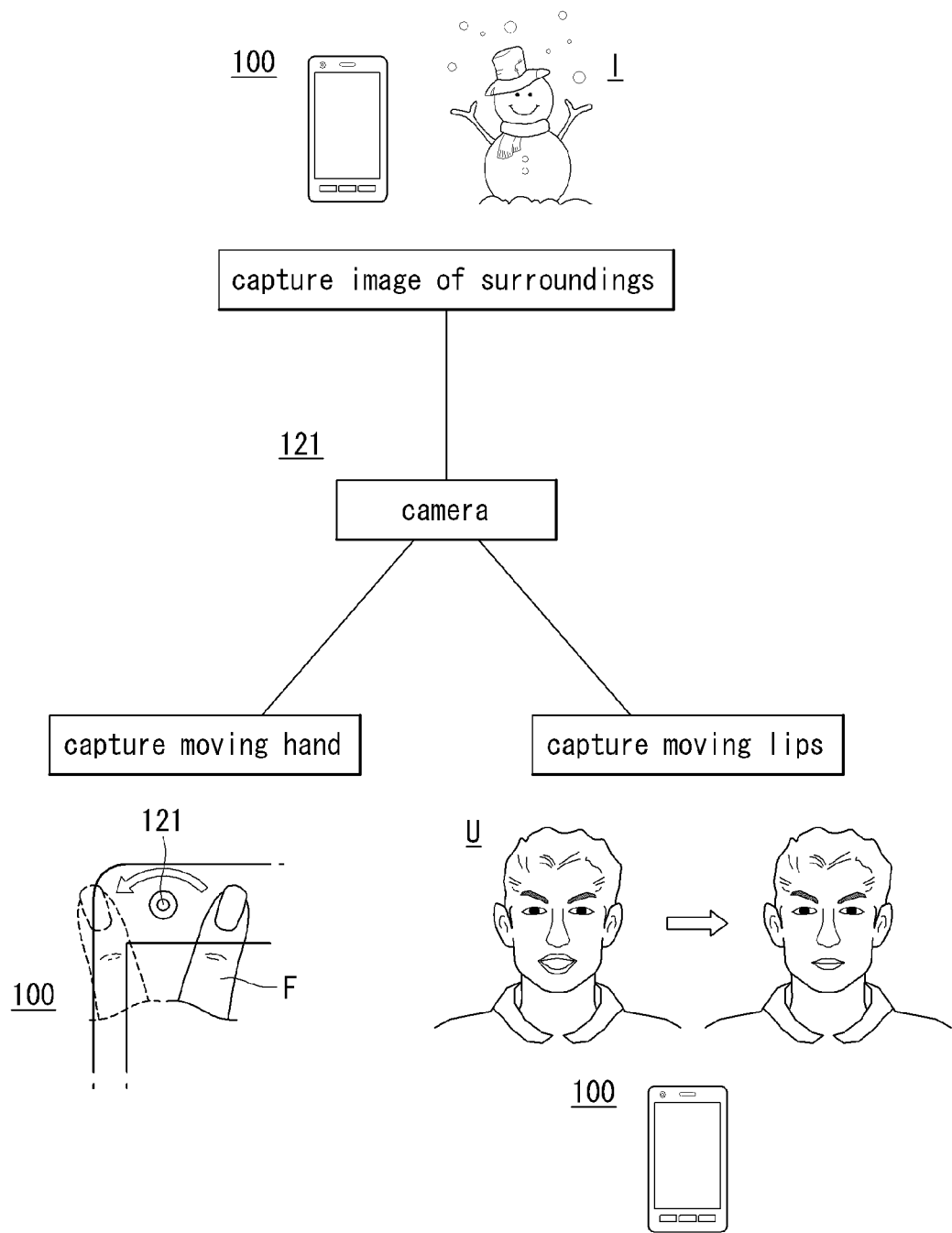

Referring to FIG. 12, the mobile terminal 100 may include the camera 121.

The camera 121 can capture an image I of the environment in which the mobile terminal 100 is located. For example, if the captured image I of the surrounding environment includes a snowman, the controller 180 can estimate the current season and external temperature.

The camera 121 can capture a movement of a user's hand. For example, the camera 121 can capture a movement of a finger F to the left and right. The controller 180 can determine that the user tries to change the touch input mode to the non-touch input mode or change the non-touch input mode to the touch input mode when the camera 121 captures a movement of the user's hand.

The camera 121 can capture a movement of user's lips. For example, when the camera 121 captures moving of the user's lips in front of the mobile terminal 100, the controller 180 can estimate a command of the user through the image of the user's limps.

Figure 13:
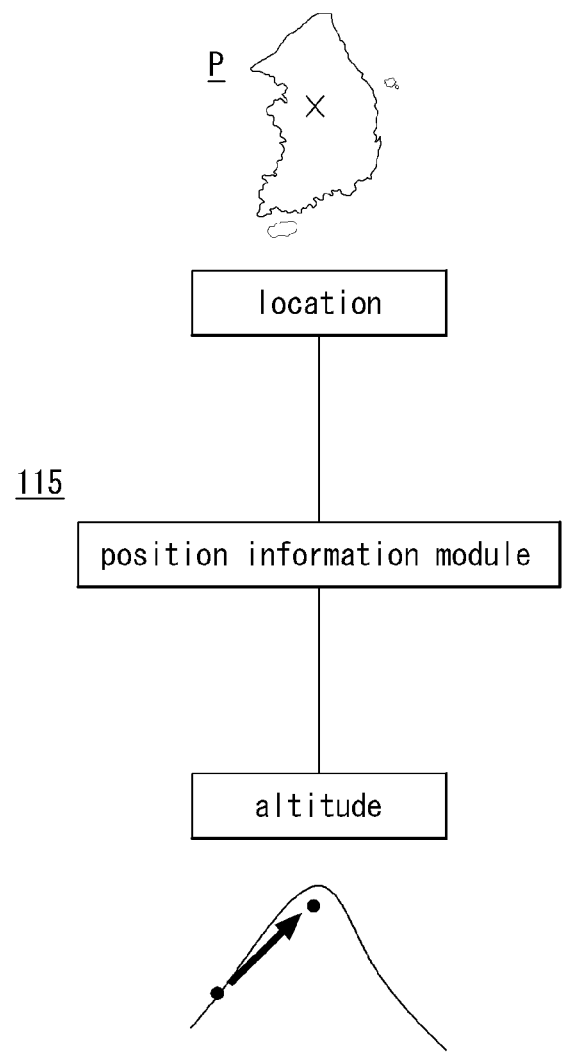

Referring to FIG. 13, the mobile terminal may include the position information module 115.

The position information module 115 can sense the current position P of the mobile terminal 100. In addition, the position information module 115 can sense information about the altitude of a point at which the mobile terminal 100 is located.

Figure 14:
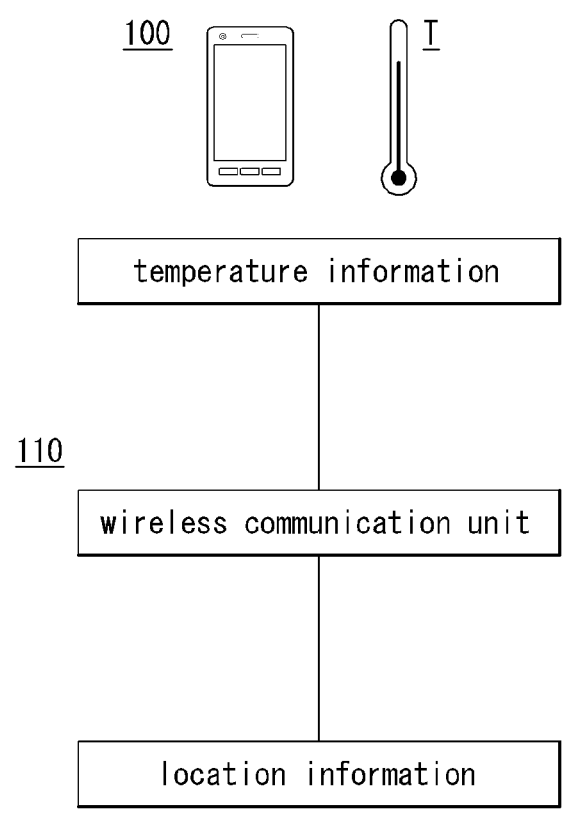

Referring to FIG. 14, the mobile terminal 100 may include the wireless communication unit 110.

The wireless communication unit 110 may acquire temperature information or position information from other terminals and/or a server. For example, the wireless communication unit 110 can obtain weather information by accessing a server that stores the weather information. Furthermore, the wireless communication unit 110 can acquire position information about a point at which the mobile terminal 100 is located using a positional relationship between base stations.

Figure 15:
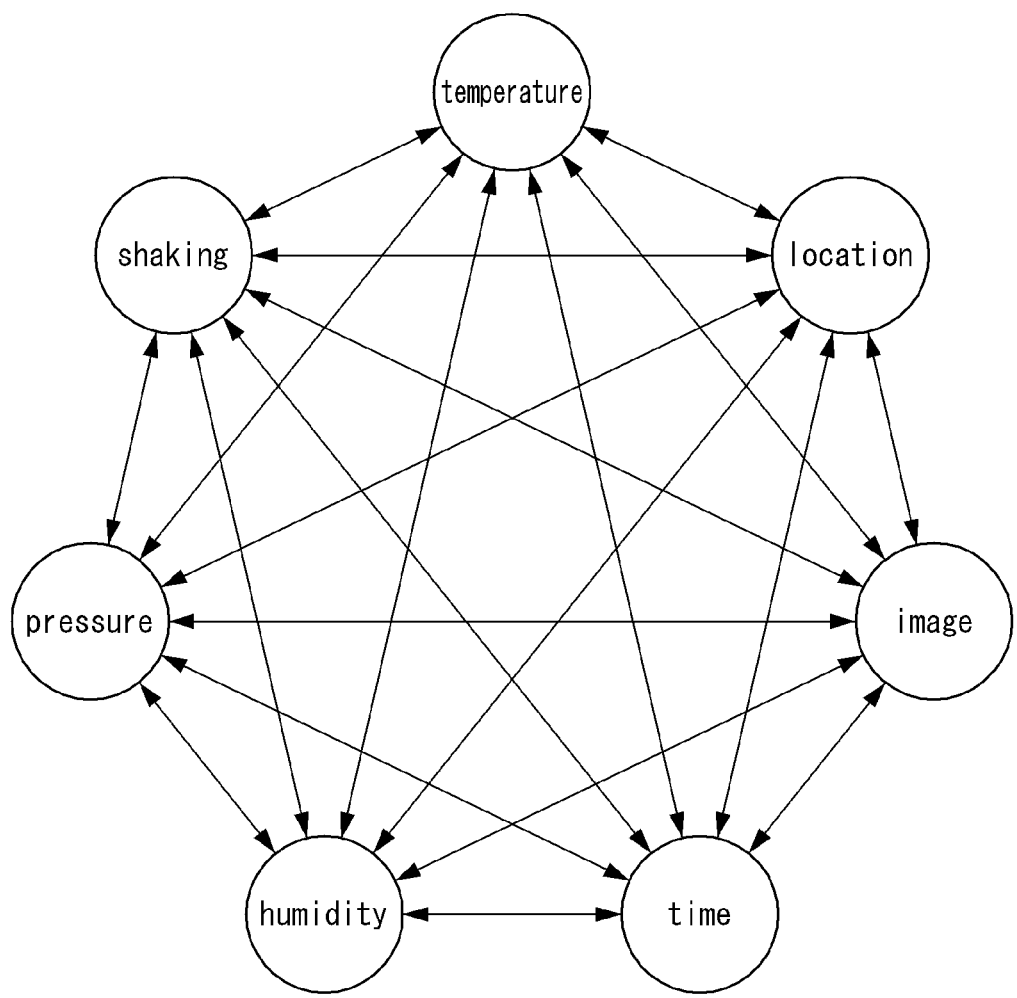
FIG. 15 illustrates relationships among external states of the mobile terminal shown in FIG. 1.

FIG. 15 shows relationship among external states of the mobile terminal shown in FIG. 1.

As shown in FIG. 15, the controller 180 of the mobile terminal 100 according to an embodiment of the present invention can determine an external state of the mobile terminal 100 using acquired or sensed information and/or a combination of information. For example, the controller 180 can recognize that the user attempts to use the mobile terminal 100 from information representing shaking of the mobile terminal 100 or pressure applied to the mobile terminal 100. In the state that the controller 180 recognizes that the user tries to use the mobile terminal 100, the mobile terminal 100 can sense the ambient temperature. Finally, the controller 180 can change the input mode of the mobile terminal 100 to the non-touch input mode on the basis of the fact that the user wants to use the mobile terminal 100 in an outdoor area at a low temperature.

The controller 180 can change the input mode of the mobile terminal 100 to the touch input mode or non-touch input mode by correctly determining the external state of the mobile terminal 100 through various combinations of obtained information. The controller 180 can control the mobile terminal 100 to be in one of the touch input mode and non-touch input mode, which is suitable for the user to operate the mobile terminal 100, to thereby improve user convenience.

Figure 16:
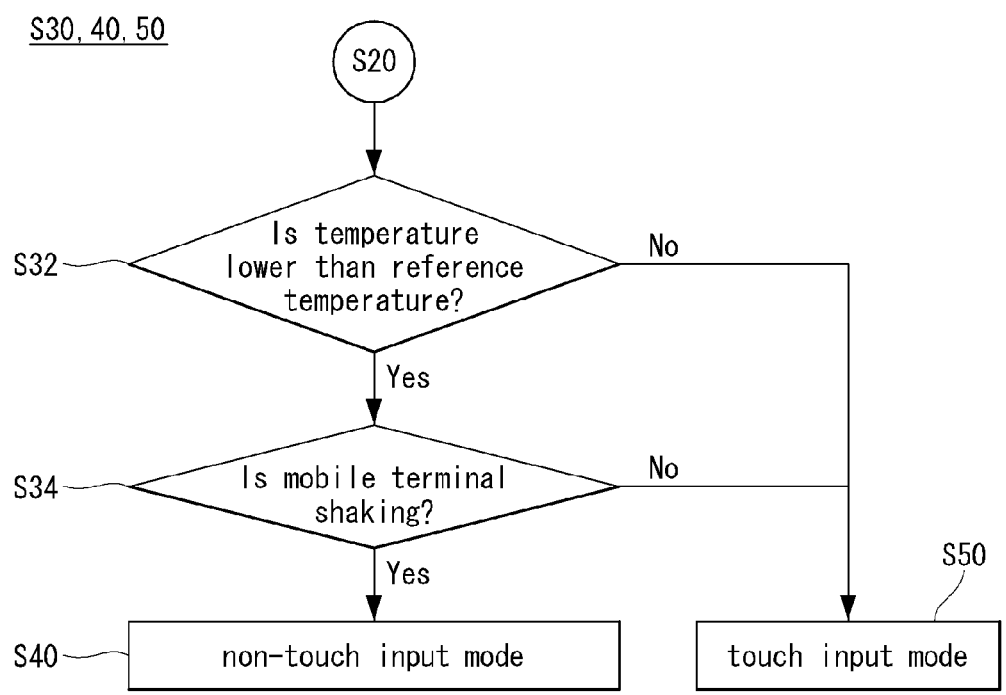
FIG. 16 illustrates part of the operation of the mobile terminal, shown in FIG. 1.

FIG. 16 illustrates part of the operation of the mobile terminal 100, shown in FIG. 1, according to an embodiment of the present invention.

Referring to FIG. 16, the controller 180 of the mobile terminal 100 according to an embodiment of the present invention may determine whether the current temperature is lower than a reference temperature (S32). In this case, the controller 180 of the mobile terminal 100 can determine whether the current temperature is lower than the reference temperature on the basis of acquired or sensed temperature information.

The controller 180 of the mobile terminal 100 may determine whether shaking of the mobile terminal 100 is sensed (S34).

If the current temperature is lower than the reference temperature and the mobile terminal 100 is shaken, the controller 180 may controls the mobile terminal 100 to be in the non-touch input mode (S40). If not, the controller 180 may control the mobile terminal 100 to be in the touch input mode (S50). In this manner, the controller 180 can actively change the input mode of the mobile terminal 100 according to external state, to thereby improve convenience of operation of the mobile terminal 100.

The input mode may be changed according to situation. For example, the touch input mode can be changed to the non-touch input mode when the environment in which the mobile terminal 100 is used varies and vice versa FIGS. 17 and 18 illustrate an exemplary operation of the mobile terminal 100 in the non-touch input mode.

Figure 17:
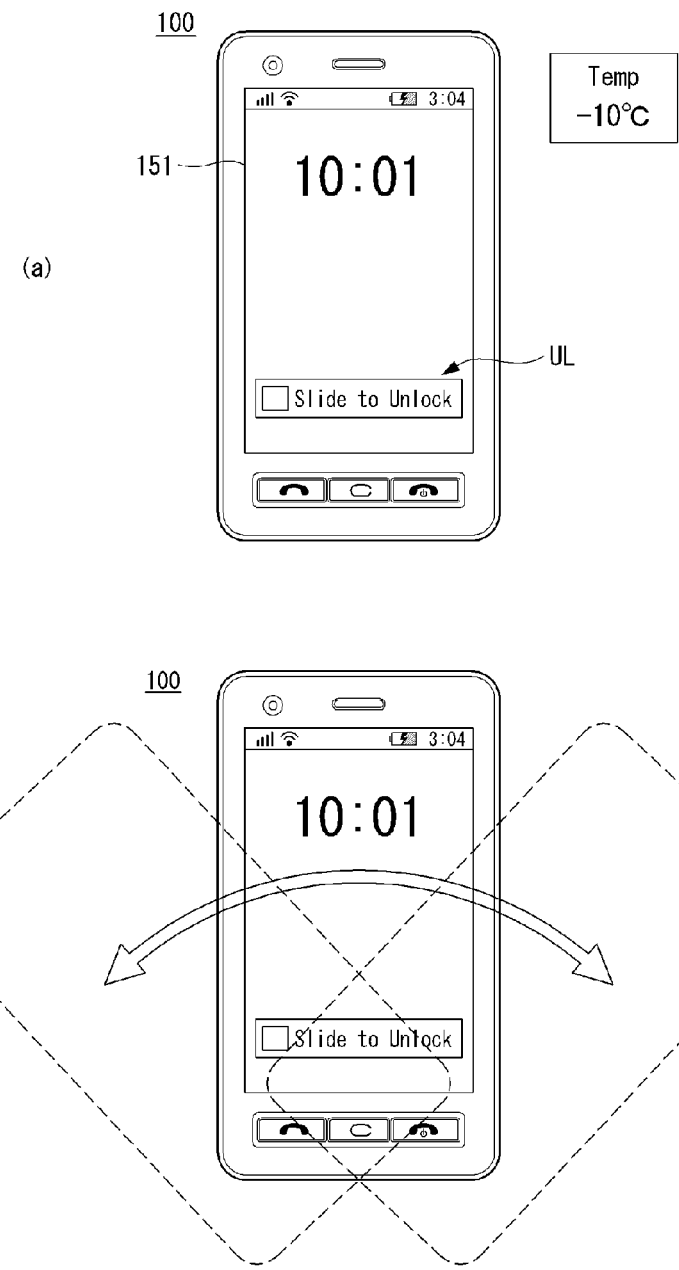
FIGS. 17(*a*), 17(*b*), 18(*a*) and 18(*b*) illustrate a non-touch input mode operation of the mobile terminal shown in FIG. 1 according to an embodiment of the present invention.

Referring to FIGS. 17 and 18, the mobile terminal 100 according to an embodiment of the present invention may operate in the non-touch input mode in a specific situation.

As shown in FIG. 17(a), the mobile terminal 100 may be in a lock screen state. In addition, a sensed outside temperature may be lower than 10 degrees below zero.

In this case, the user may shake the mobile terminal 100, as shown in FIG. 17(b).

Referring to FIG. 18(a), when the controller 180 senses shaking of the mobile terminal 100 at a low outside temperature, the controller 180 can change the input mode of the mobile terminal 100 to the non-touch input mode. The controller 180 can display the change to the non-touch input mode through a first pop-up window P1.

When the input mode of the mobile terminal 100 is changed to the non-touch input mode, the user can operate the mobile terminal 100 using an input means other than touch. For example, the user can execute an oral command OR saying "unlock".

Referring to FIG. 18(b), upon input of the oral command OR from the user, the controller 180 can perform an operation corresponding to the oral command. For example, the mobile terminal 100 in the lock screen state can be unlocked. The controller 180 can display the unlock state through a second pop-up window P2. Even after the mobile terminal 100 is unlocked, the user can operate the mobile terminal 100 using a non-touch input means.

Figure 19:
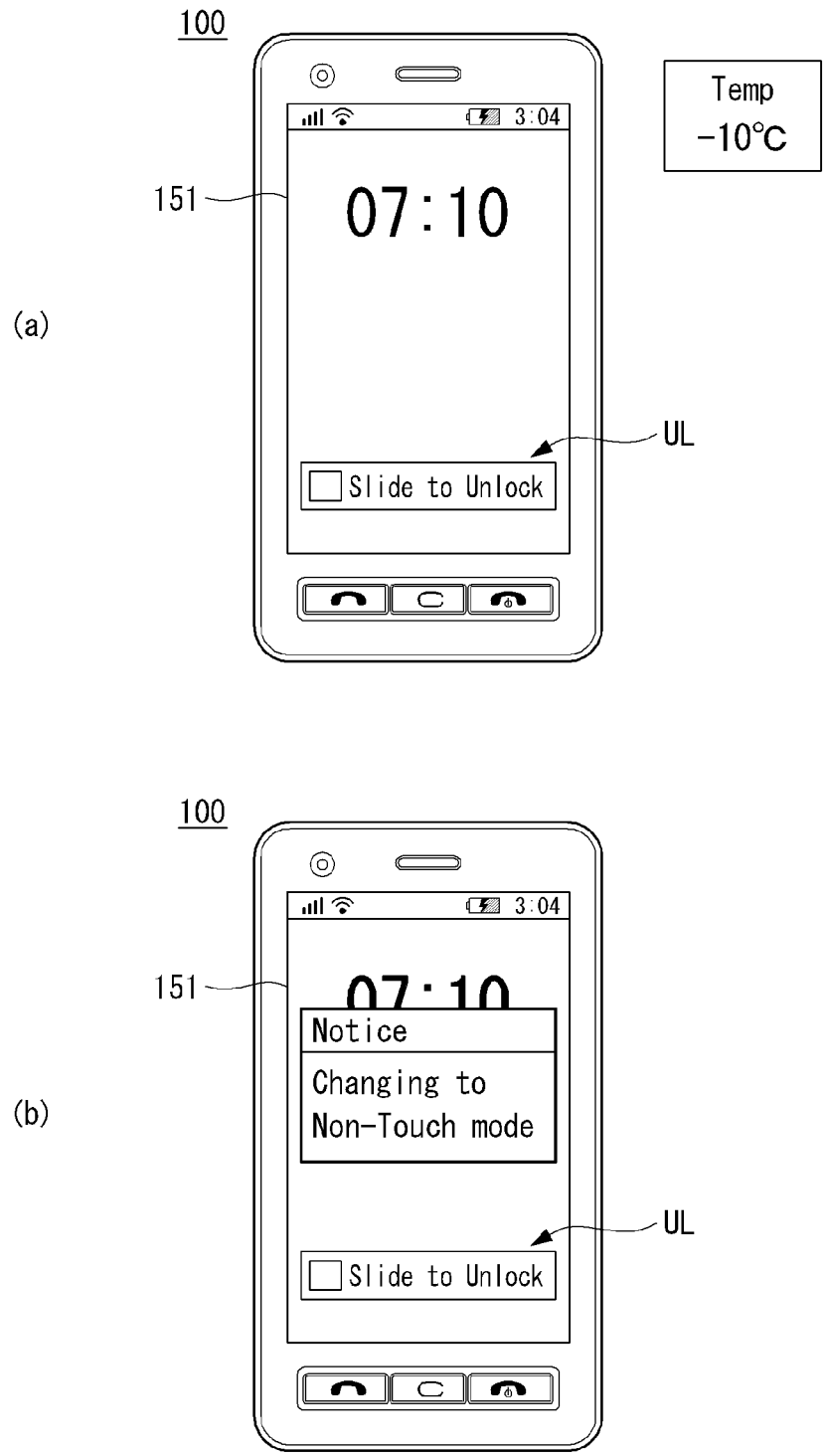
FIGS. 19 and 20 illustrate a non-touch input mode operation of the mobile terminal shown in FIG. 1 according to another embodiment of the present invention.
Figure 20:
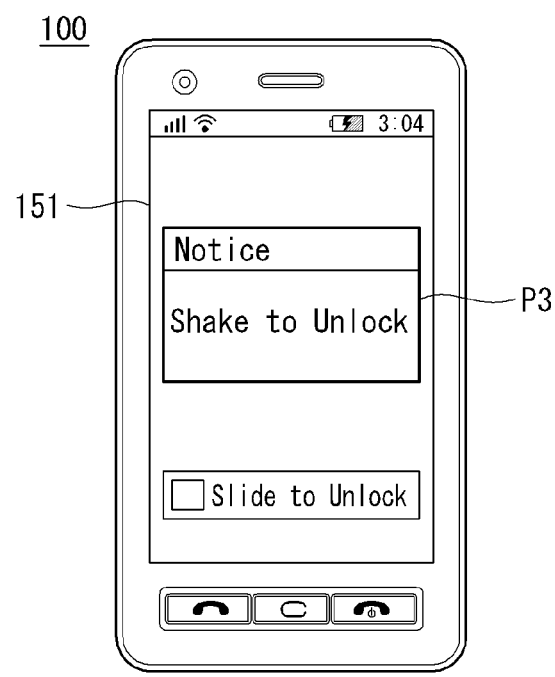

FIGS. 19 and 20 illustrate another exemplary operation of the mobile terminal 100 in the non-touch input mode.

As shown in FIGS. 19 and 20, the controller 180 of the mobile terminal 100 according to an embodiment of the present invention can change the input mode of the mobile terminal when a specific condition is satisfied.

As shown in FIG. 19(a), the mobile terminal 100 may be in a lock state when the outside temperature is low.

Referring to FIG. 19(b), when the outside temperature is low, the controller 180 can change the input mode of the mobile terminal 100 to the non-touch input mode. In this case, the controller 180 can take the current time into account. For example, when the current time is 7:10 in the morning, the user may be on his way to work. Accordingly, the controller 180 can determine that the user is outside and on his way to work from the fact that the temperature is low. Based on this, the controller 180 can automatically change the input mode of the mobile terminal 100 to the non-touch input mode.

The controller 180 may consider a temperature variation. For example, the fact that the outside temperature of the mobile terminal 100 decreases while the user is on his way to work may mean that the user takes the mobile terminal 100 out of his pocket in order to use the mobile terminal 100. In this case, the controller 180 can change the input mode of the mobile terminal 100 to the non-touch input mode.

Referring to FIG. 20, upon change to the non-touch input mode, the controller 180 may display a guide message for operating the mobile terminal 100. For example, the controller 180 can display a message instructing the user to shake the mobile terminal 100 to unlock the mobile terminal 100 through a third pop-up window P3.

Figure 22:
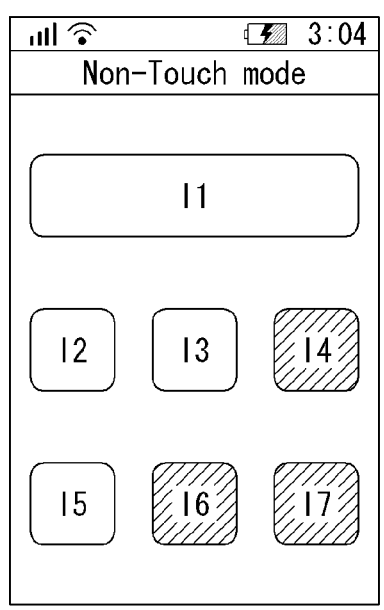

FIGS. 21 and 22 show icon arrangements when the mobile terminal 100 shown in FIG. 1 enters the non-touch input mode.

As shown in FIGS. 21 and 22, the controller 180 of the mobile terminal 100 according to an embodiment of the present invention can operate the mobile terminal 100 in the non-touch input mode using various methods.

Referring to FIG. 21(a), a background screen on which icons corresponding to applications are arranged may be display in the non-touch input mode. In the non-touch input mode, icons corresponding to a situation may be selectively displayed on the background screen. For example, in a low temperature state, temperature related icons such as an icon used to execute a weather application can be displayed as a first icon I1. If the mobile terminal 100 is located in an unusual place, way-finding related icons such as an icon used to execute a map application may be displayed as the first icon I1.

Referring to FIG. 21(b), an icon size may be changed in the non-touch input mode. In the non-touch input mode, a specific icon may be selected using eye tracking, which will be described below. In this case, accuracy of selection may decrease as compared to the case of touch input. Accordingly, when the mobile terminal 100 enters the non-touch input mode, the controller 180 can adjust the icon size such that the user can easily select an icon.

Referring to FIG. 22, the controller 180 can activate or deactivate a specific icon in the non-touch input mode. That is, the controller 180 can deactivate a specific icon unrelated to the circumstance in which the mobile terminal 100 is located. For example, when the current state relates to temperature, the controller 180 can deactivate fourth, sixth and seventh icons 14, 16 and 17 related to way-finding.

FIGS. 23 to 26 illustrate a procedure of selecting an icon in the non-touch input mode of the mobile terminal shown in FIG. 1.

As shown in FIGS. 23 to 26, the mobile terminal 100 according to an embodiment of the present invention can be controlled through various non-touch means in the non-touch input mode.

Figure 23:
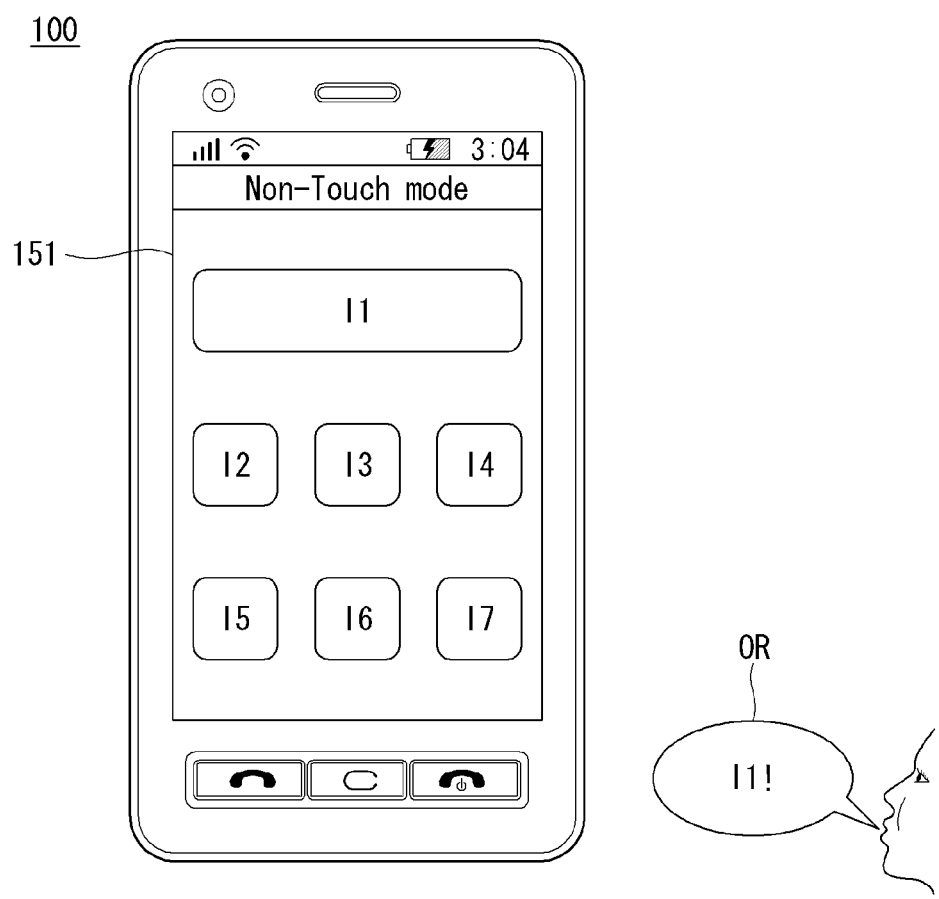

Referring to FIG. 23, when the mobile terminal 100 is in the non-touch input mode, the user can control the mobile terminal 100 through a voice command OR. For example, when the user says "I1", the controller 180 can execute an application corresponding to the first icon I1 according to the voice command.

Figure 24:
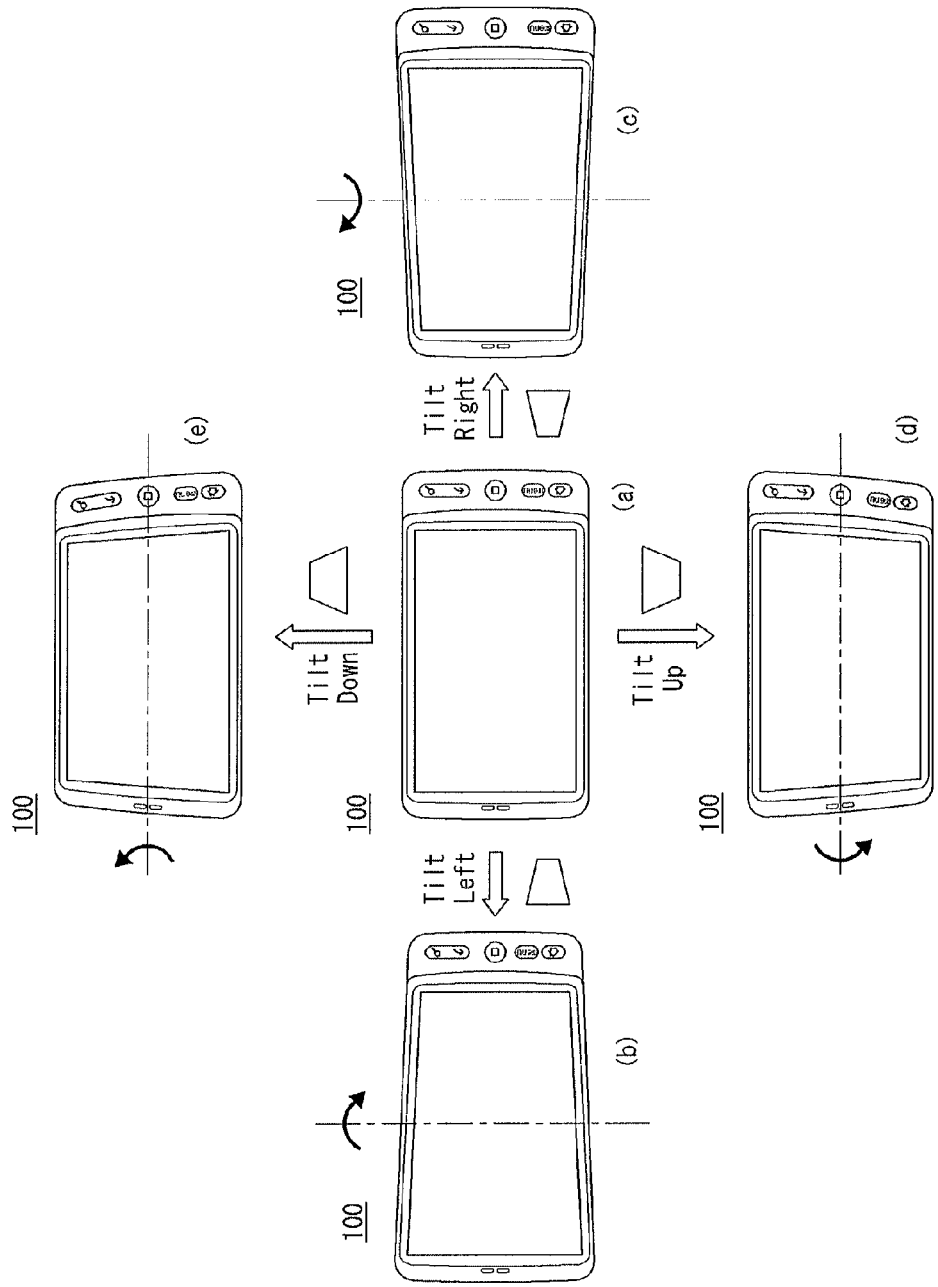

Referring to FIG. 24, when the mobile terminal 100 is in the non-touch input mode, the user can select a specific icon by tilting the mobile terminal 100 to a specific direction. For example, when the user tilts the mobile terminal 100 left, right, up or down, the posture detection sensor (141 of FIG. 4) can sense the tilting direction of the mobile terminal 100. The controller 180 can execute an application indicated by an icon corresponding to the tilting direction sensed by the posture detection sensor (141 of FIG. 4).

Referring to FIG. 25(a), icons may be arranged on the display 151 of the mobile terminal 100 in the touch input mode.

Referring to FIG. 25(b), when the mobile terminal 100 enters the non-touch input mode, arrangement of the icons may change. For example, the icons can be arranged in a circle such that the position of a selection indicator SI is changed to easily select a specific icon by tilting the mobile terminal 100.

Figure 26:
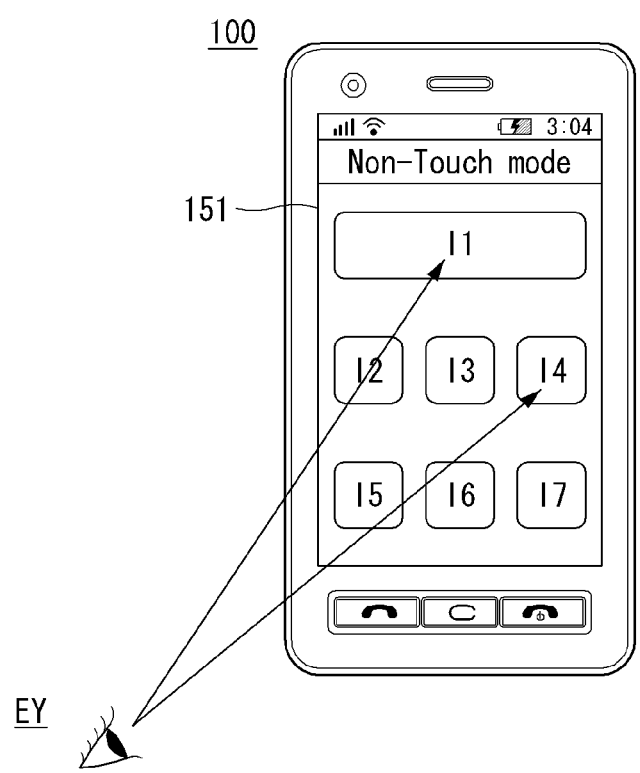

Referring to FIG. 26, a specific icon can be selected through an eye tracking method of selecting an icon according to the eye EY of the user. For example, a direction to which the eyes of the user see, captured using the camera 121, is sensed and an icon corresponding to the direction is selected.

Figure 27:
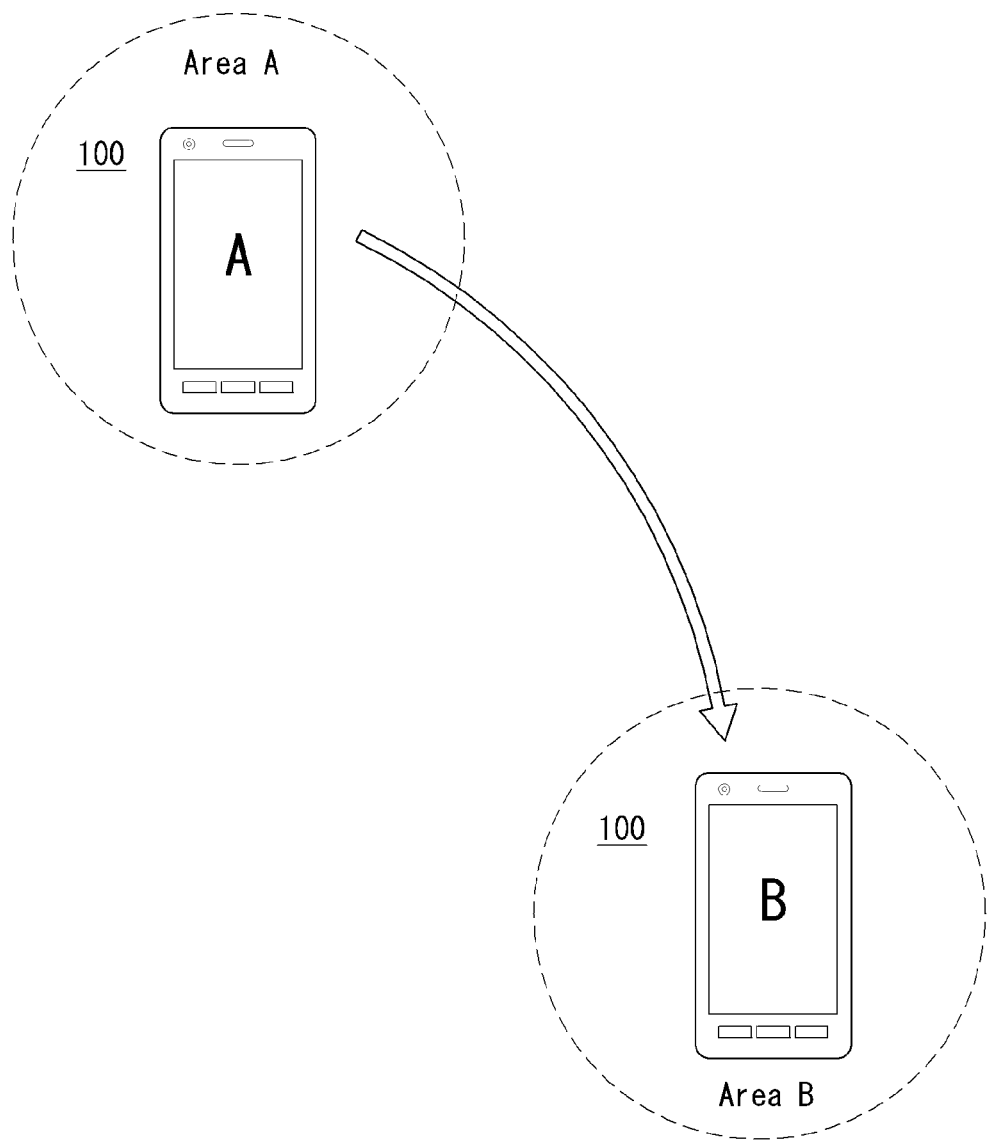
FIG. 27 illustrates a display method according to place in the mobile terminal shown in FIG. 1.

FIG. 27 illustrates a display method according to place in the mobile terminal shown in FIG. 1.

As shown in FIG. 27, the controller 180 of the mobile terminal 100 according to an embodiment of the present invention may display different screens according to location of the mobile terminal 100. That is, the controller 180 can display a different screen on the display 151 on the basis of the location of the mobile terminal 100, acquired through the position information module (115 of FIG. 1). For example, the controller 180 can execute application "A" in area A and execute application "B" in area B. The mobile terminal 100 can be used more conveniently because a screen is displayed depending on the current location of the user.

FIGS. 28 to 32 illustrate a procedure of setting the non-touch input mode of the mobile terminal shown in FIG. 1.

As shown in FIGS. 28 to 32, the controller 180 of the mobile terminal 100 according to an embodiment of the present invention can provide a menu M for setting the non-touch input mode.

Figure 28:
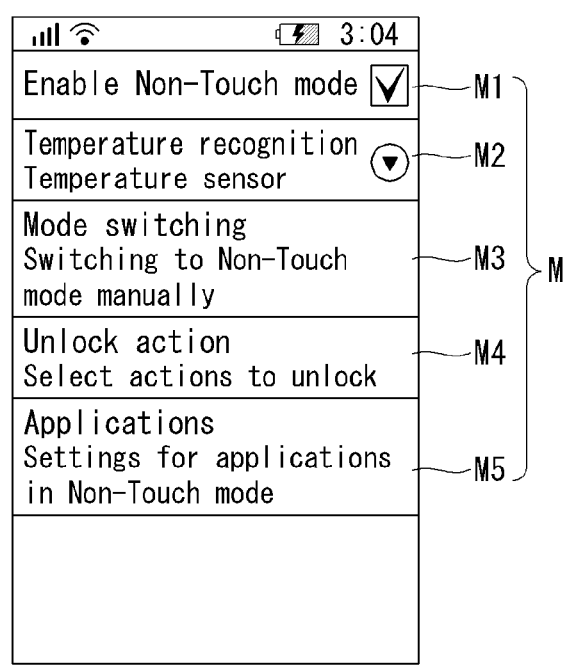
FIGS. 28(*a*) to 32(*d*) illustrate a procedure of setting the non-touch input mode of the mobile terminal shown in FIG. 1.

Referring to FIG. 28, a first menu M1 for enabling the non-touch input mode, a second menu M2 associated with temperature recognition, a third menu M3 for mode switching, a fourth menu M4 associated with unlock action, and a fifth menu M5 for setting applications may be displayed in the non-touch input mode.

Referring to FIG. 29(*a*), the user can enable the non-touch input mode by selecting the first menu M1. The user can select the second menu M2 using a finger F.

Referring to FIG. 29(*b*), when the user selects the second menu M2, the controller 180 can display sixth and seventh menus M6 and M7 through which a method of sensing or acquiring temperature can be selected. That is, it is possible to select the temperature sensor or the sever to acquire temperature data through the sixth or seventh menu M6 or M7.

Referring to FIG. 30(*a*), the user can select the third menu M3 using the finger F.

Referring to FIG. 30(*b*), upon selection of the third menu M3 by the user, the controller 180 can provide a screen through which a means for changing to the non-touch input mode can be selected. For example, when "shaking" is selected, the mobile terminal 100 can enter the non-touch input mode when the user shakes the mobile terminal 100 to a certain degree.

Referring to FIG. 31(*a*), the user can select the fourth menu M4 using the finger F.

Referring to FIG. 31(*b*), the controller 180 can provide a screen through which a means for unlocking can be selected in the non-touch input mode.

Referring to FIG. 32(*a*), the user can select the fifth menu M5 using the finger.

Referring to FIG. 32(*b*), the controller 180 can display an eighth menu M8 for selecting an application display form in the non-touch input mode, a ninth menu M9 for selecting a selection method, and a tenth menu M10 for selecting an application to be used.

Referring to FIG. 32(*c*), when the eighth menu M8 is selected, the controller 180 can provide a screen through which an application or icon display form can be selected. For example, larger icons, available applications, most frequently used applications, or a screen set by the user can be displayed.

Referring to FIG. 32(*d*), when the ninth menu M9 is selected, the controller 180 can provide a screen through which a selection method can be selected.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a touch screen;
a sensing unit configured to acquire one or more pieces of first external state information when the mobile terminal is in an activated condition or an inactivated condition;
a wireless communication unit configured to acquire one or more pieces of second external state information; and
a controller configured to:
set a first menu (M1) for enabling a non-touch mode, a second menu (M3) for setting a combination of information to convert into the non-touch mode, a third menu (M8) for selecting a display form of application icons in the non-touch mode, and a fourth menu (M9) for selecting a selsction method for a specific application,
identify the combination of the first external state information and the second external state information, the first external state information indicating an external temperature and a motion of gripping the mobile terminal, and the second external state information indicating a current location of the mobile terminal,
determine the combination is satisfied with the set first menu when the external temperature is lower than a reference value, the motion of gripping is detected, and the current location is outside,
change an input mode of the mobile terminal from a touch input mode to the non-touch input mode, the touch input mode indicating a touch input corresponding to a touch operation performed on the touch screen and the non-touch input mode indicating a non-touch input that does not involve a touch operation performed on the mobile terminal when the combination is satisfied with the set first menu, and
change the display form of the touch screen and the selection method for the specific application, based on the set third menu and the set fourth menu when the input mode is changed into the non-touch input mode,
wherein the display form indicates that icons are arranged in a circle such that a position of a selection indicator (SI) is changed to select a specific icon by tilting on the display unit, and
wherein the selection method for the specific application indicates that the selection indicator (SI) selects the specific icon.

2. The mobile terminal of claim 1, wherein the first external state information and the second external state information include at least one of an ambient temperature of the mobile terminal, a temperature of the mobile terminal, shaking of the mobile terminal, a posture of the mobile terminal when gripped, an orientation of the mobile terminal, information about whether an external object approaches the mobile terminal, an increase/decrease in the pressure applied to the mobile terminal, an ambient humidity of the mobile terminal, an image of surroundings of the mobile terminal, location of the mobile terminal, and time when the mobile terminal is used.

3. The mobile terminal of claim 1, wherein the non-touch input corresponds to at least one of a specific motion applied to the mobile terminal, a specific pressure applied to the mobile terminal, voice of a user of the mobile terminal, blowing of the user of the mobile terminal, a gesture of the user of the mobile terminal, tilting of the mobile terminal, and a direction of the eyes of the user of the mobile terminal toward a specific point of the mobile terminal.

4. The mobile terminal of claim 1, wherein the controller is further configured to provide a screen to select the first external state information and the second external state information by selecting the second menu (M3).

5. The mobile terminal of claim 1, wherein the controller is further configured to provide a screen to select the arrangement form of application icons in the non-touch mode by selecting the third menu (M8).

6. The mobile terminal of claim 1, wherein the controller is further configured to select the execution condition of the specific application by selecting the fourth menu (M10).

7. The mobile terminal of claim 1, wherein the icons corresponds to at least one application icon corresponding to at least one of a temperature, a motion of the mobile terminal, or a location.

8. The mobile terminal of claim 1, wherein the controller is configured to change sizes of the icons in the non-touch input mode to be larger than sizes of icons in the touch input mode.

9. A method for controlling a mobile terminal including a touch screen, comprising:
acquiring one or more pieces of first external state information through a sensing unit of the mobile terminal when the mobile terminal is in an activated condition or an inactivated condition;
acquiring one or more pieces of second external state information through a wireless communication unit of the mobile terminal;
setting a first menu (M1) for enabling a non-touch mode, a second menu (M3) for setting a combination of information to convert into the non-touch mode, a third menu (M8) for selecting a display form of application icons in the non-touch mode, and a fourth menu (M9) for selecting a selection method for a specific application;
identifying the combination of the first external state information and the second external state information, the first external state information indicating an external temperature and a motion of gripping the mobile terminal, and the second external state information indicating a current location of the mobile terminal;
determining that the combination is satisfied with the set first menu;
determining the combination is satisfied with the set first menu when the external temperature is lower than a reference value, the motion of gripping is detected, and the current location is outside;
changing an input mode of the mobile terminal from a touch input mode to the non-touch input mode, the touch input mode indicating a touch input corresponding to a touch operation performed on the touch screen and the non-touch input mode indicating a non-touch input that does not involve a touch operation performed on the mobile terminal when the combination is satisfied with the set first menu; and
changing the display form of the touch screen and the selection method for the specific application based on the set third menu and the set fourth menu when the input mode is changed into the non-touch input mode, wherein the display form indicates that icons are arranged in a circle such that a position of a selection indicator (SI) is changed to select a specific icon by tilting on the display unit, and wherein the selection method for the specific application indicates that the selection indicator (SI) selects the specific icon.

10. The method of claim 9, wherein the plurality of pieces of the first external state information and the second external state information includes an ambient temperature of the mobile terminal.

11. The method of claim 9, further comprising changing the touch input mode or the non-touch input mode when at least one of the first external state information and the second external state information changes.

12. The method of claim 9, further comprising displaying, on the touch screen, a screen different from a screen displayed in the touch input mode when the input mode of the mobile terminal changes to the non-touch input mode.

13. A mobile terminal comprising:
a touch screen;
a sensing unit configured to acquire one or more pieces of external state information when the mobile terminal is in an activated condition or an inactivated condition; and
a controller configured to:
set a first menu (M1) for enabling a non-touch mode, a second menu (M3) for setting a combination of information to convert into the non-touch mode, a third menu (M8) for selecting a display form of application icons in the non-touch mode, and a fourth menu (M9) for selecting a selection method for a specific application,
identify the combination of the first external state information, the first external state information indicating an external temperature and a motion of gripping the mobile terminal,
determine the combination is satisfied with the set first menu when the external temperature is lower than a reference value, and the motion of gripping is detected,
change an input mode of the mobile terminal from a touch input mode to the non-touch input mode, the touch input mode indicating a touch input corresponding to a touch operation performed on the touch screen and the non-touch input mode indicating a non-touch input that does not involve a touch operation performed on the mobile terminal when the combination is satisfied with the set first menu, and
change the display form of the display unit and the selection method for the specific application based on the set third menu and the set fourth menu when the input mode is changed into the non-touch input mode,
wherein the display form indicates that icons are arranged in a circle such that a position of a selection indicator (SI) is changed to select a specific icon by tilting on the display unit, and
wherein the selection method for the specific application indicates that the selection indicator (SI) selects the specific icon.

14. The mobile terminal of claim 13, wherein the sensing unit comprises at least one of a posture detection sensor, a pressure sensor, a humidity sensor and a temperature sensor.

15. The mobile terminal of claim 13, wherein the plurality of pieces of the external state information includes an ambient temperature of the mobile terminal and a posture of the mobile terminal.

16. The mobile terminal of claim 13, wherein the external state information includes at least one of an ambient temperature of the mobile terminal, a temperature of the mobile terminal, shaking of the mobile terminal, a posture of the mobile terminal when gripped, an orientation of the mobile terminal, information about whether an external object approaches the mobile terminal, an increase/decrease in the pressure applied to the mobile terminal, an ambient humidity of the mobile terminal, an image of surroundings of the mobile terminal, location of the mobile terminal, and time when the mobile terminal is used.

17. The mobile terminal of claim 13, wherein the external state information includes a variation in temperature in different regions of the mobile terminal.

* * * * *